US012772185B2

(12) United States Patent
Chandran et al.

(10) Patent No.: US 12,772,185 B2
(45) Date of Patent: Oct. 20, 2026

(54) SYNCHRONIZATION MANAGEMENT IN LOWER-LAYER SPLIT RADIO ACCESS NETWORKS

(71) Applicant: DISH Wireless L.L.C., Littleton, CO (US)

(72) Inventors: Premchand Chandran, Ashburn, VA (US); Gurpreet Sohi, Parker, CO (US); Julio Armenta, Aldie, VA (US)

(73) Assignee: DISH Wireless L.L.C., Littleton, CO (US)

(*) Notice: Subject to any disclaimer, the term of this patent is extended or adjusted under 35 U.S.C. 154(b) by 247 days.

(21) Appl. No.: 18/789,878

(22) Filed: Jul. 31, 2024

(65) Prior Publication Data

US 2026/0040239 A1 Feb. 5, 2026

(51) Int. Cl.
*H04W 56/00* (2009.01)
*H04J 3/06* (2006.01)
*H04L 5/14* (2006.01)

(52) U.S. Cl.
CPC ......... *H04W 56/001* (2013.01); *H04J 3/0667* (2013.01); *H04L 5/14* (2013.01)

(58) Field of Classification Search
CPC ....... H04J 3/0667; H04L 5/14; H04W 56/001; H04W 56/0015
See application file for complete search history.

(56) References Cited

U.S. PATENT DOCUMENTS

2022/0268943 A1* 8/2022 Gomez .................. G01S 19/23
2024/0224205 A1* 7/2024 Machireddy .......... H04J 3/0667
2024/0422107 A1* 12/2024 Sharma ............... H04L 41/0806
2025/0070904 A1* 2/2025 Palermo ................ H04L 5/0051
2025/0351097 A1* 11/2025 Ryu .................. H04W 56/0015

* cited by examiner

*Primary Examiner* — Awet Haile
(74) *Attorney, Agent, or Firm* — Kilpatrick Townsend & Stockton LLP

(57) ABSTRACT

Techniques for synchronizing components of a Lower-Layer Split Radio Access Network (RAN) are provided. In one example, a RAN includes a first Distributed Unit (DU) having: a containerized Cell Site Router (cCSR) that routes user data, control data, or both between the first DU, Radio Units (RUs) of the RAN; and a timing Network Interface Card (NIC) connected to a Global Navigation Satellite System (GNSS) receiver, by which an internal clock of the timing NIC is set. A first RU and a second DU, both connected to the timing NIC of first DU, synchronize their internal clocks to that of the timing NIC using timing information received from the timing NIC.

20 Claims, 14 Drawing Sheets

SYNCHRONIZATION MANAGEMENT IN LOWER-LAYER SPLIT RADIO ACCESS NETWORKS

FIELD

The present invention generally relates to communications, and more specifically, to synchronization plane (S-plane) configurations in different Lower-Layer Split (LLS) configuration deployments.

BACKGROUND

Mobile telecommunications networks include Radio Access Networks (RANs) and a network core. RANs belonging to fourth generation (4G) cellular technology are known as Long Term Evolution (LTE) and RANs belonging to fifth generation (5G) cellular technology are known as New Radio (NR), which has been standardized to allow tight interworking with LTE. The RAN includes antennae seen on cellular telecommunications towers and other locations (e.g., on top of buildings, in stadiums, etc.). When a cellular telephone call is made via a mobile device or a Short Message Service (SMS) message is sent, for example, antenna(s) of the RAN transmit signals to and receive signals from the mobile device. The RAN base station also digitizes the signals from the mobile device and sends this information to the network core.

In an Open RAN (O-RAN) architecture, the RAN includes three main building blocks: the Radio Unit (RU), the Distributed Unit (DU), and the Centralized Unit (CU). The RUs transmit, receive, amplify, and digitize radio frequency signals. RUs are located near, or integrated into, an antenna of the cellular telecommunications tower, and are operably connected to the antenna. Each cellular telecommunications tower may have multiple RUs to fully service various bands for a particular coverage area. The DU receives the digitized radio signals from the RU(s) via a Cell Site Router (CSR) that routes traffic from the RUs to the DU and sends the digitized radio signal to the CU for further processing. The DU is usually physically located at or near the RU, whereas the CU can be located nearer to the network core (e.g., in a Pass-through Edge Data Center (PEDC) or a Breakout Edge Data Center (BEDC)).

The key concept of O-RAN is "opening" the protocols and interfaces between the various building blocks (i.e., radios, hardware, and software) in the RAN. The O-RAN Alliance has defined various interfaces within the RAN, including those for fronthaul between the RU and the DU, midhaul between the DU and the CU, and backhaul connecting the RAN to the network core. The CU accommodates the higher protocol stack layers while the DU accommodates the lower protocol stack layers.

In O-RAN, the synchronization plane (S-plane) provides synchronization between the RUs and DU. Timing in a 5G RAN requires nanosecond-scale accuracy. The O-RAN fronthaul can have different synchronization options over an Ethernet network: frequency synchronization, phase synchronization, or time synchronization. Frequency synchronization is where the DU and RU clocks are aligned in frequency. Phase synchronization is where the DU and RU clocks are aligned in phase. Time synchronization is where the DU and RU clocks are aligned to a common base time.

As RAN technology evolves, providing new functionalities and/or coverage may involve expanding existing RANs to include additional fronthaul connections and/or configurations. To accommodate this expansion, improved and/or alternative approaches to existing S-plane configurations may be beneficial.

SUMMARY

Certain embodiments of the present invention may provide solutions to the problems and needs in the art that have not yet been fully identified, appreciated, or solved by current communications technologies, and/or provide a useful alternative thereto. For example, some embodiments of the present invention pertain to synchronization management in LLS RANs. In some embodiments, a Radio Access Network (RAN) is provided. The RAN may include a Cell Site Router (CSR) that provides reference timing for other components of the RAN. The RAN may further include a first Radio Unit (RU) connected to the CSR. The first RU may be synchronized to a Primary Reference Time Clock (PRTC) via first reference timing information received from the CSR. The RAN may further include a first Distributed Unit (DU) connected to the CSR. In some embodiments, the first DU is synchronized to the PRTC via second reference timing information received from the CSR, and the first DU manages the first RU via the CSR. The RAN may further include a second DU connected to the CSR, the first DU, or both. The second DU may be synchronized to the PRTC via third reference timing information received from the CSR or the first DU. The RAN may further include a second RU connected to the second DU. In some embodiments, the second DU manages the second RU and the second RU is synchronized to the PRTC via fourth reference timing information received from the second DU.

In some embodiments of the RAN, the first RU, the first DU, the second DU, and the second RU are synchronized using the Precision Time Protocol (PTP). In some embodiments of the RAN, the CSR provides the reference timing for the other components of the RAN at a physical layer. In some embodiments of the RAN, the reference timing is embedded in an electrical signal carrying user data, control data, or both, from the CSR to the first RU, the first DU, or both.

In some embodiments of the RAN, clock frequencies of the CSR, the first RU, the first DU, and the second DU are synchronized to a clock frequency of the PRTC; and a clock frequency of the second RU is synchronized to the clock frequency of the second DU using the fourth reference timing information. In some embodiments of the RAN, clock signals produced by the CSR, the first RU, the first DU, and the second DU are phase synchronized with a clock signal of the PRTC; and a clock signal produced by the second RU is phase synchronized with the clock signal of the second DU using the fourth reference timing information. In some embodiments of the RAN, clocks of the CSR, the first RU, the first DU, and the second DU are synchronized in time with the PRTC; and a clock of the second RU is synchronized in time with the clock of the second DU using the fourth reference timing information.

In some embodiments of the RAN, the CSR comprises the PRTC. In some embodiments of the RAN, the first DU uses Frequency Division Duplexing (FDD) and the second DU uses Time Division Duplexing (TDD), or vice versa. In some embodiments of the RAN, both the first DU and the second DU use Frequency Division Duplexing (FDD), or both the first DU and the second DU use Time Division Duplexing (TDD). In some embodiments of the RAN, the first RU uses frequency division duplexing (FDD); and the second RU uses Time Division Duplexing (TDD). In some embodiments of the RAN, the first RU, the second RU, or both are part of at least one of: a femtocell, a picocell, or a microcell.

The RAN may further include a Global Navigation Satellite System (GNSS) receiver connected to the CSR. In some embodiments, the reference timing is generated by a clock of the CSR and the clock of the CSR is set using GNSS signals from the GNSS receiver. The RAN may further include a third RU in communication with the second RU and managed by the second DU. In some embodiments, the second RU provides fifth reference timing information to the third RU and the third RU is synchronized to the PRTC via fifth reference timing information received from the second RU. In some embodiments, the CSR, the first RU, the second RU, the first DU, and the second DU are part of a 5G cellular network.

In some embodiments, a method of synchronizing components in a Radio Access Network (RAN) is provided. The method may include receiving, by a first Radio Unit (RU), first reference timing information from a Cell Site Router (CSR). The method may further include synchronizing, by the first RU, an internal clock of the first RU to a Primary Reference Time Clock (PRTC) using the first reference timing information. The method may further include receiving, by a first Distributed Unit (DU), second reference timing information from the CSR, wherein the first DU manages the first RU via the CSR. The method may further include synchronizing, by the first DU, an internal clock of the first DU to the PRTC using the second reference timing information. The method may further include receiving, by a second DU, third reference timing information from the CSR, wherein the second DU manages a second RU directly. The method may further include synchronizing, by the second DU, an internal clock of the second DU to the PRTC using the third reference timing information. The method may further include transmitting, by the second DU, fourth reference timing information to the second RU. The method may further include synchronizing, by the second RU, an internal clock of the second RU to the PRTC using the fourth reference timing information.

In some embodiments, the first reference timing information, the second reference timing information, and the third reference timing information are generated by an internal clock of the CSR. The method may further include receiving, by the CSR, Global Navigation Satellite System (GNSS) signals from a GNSS receiver and setting, by the CSR, the internal clock of the CSR using the GNSS signals.

In some embodiments, another method of synchronizing components in a Radio Access Network (RAN) is provided. The method may include receiving, by a first Radio Unit (RU), first reference timing information from a Cell Site Router (CSR). The method may further include synchronizing, by the first RU, an internal clock of the first RU to a Primary Reference Time Clock (PRTC) using the first reference timing information. The method may further include receiving, by a first Distributed Unit (DU), second reference timing information from the CSR, wherein the first DU manages the first RU via the CSR. The method may further include synchronizing, by the first DU, an internal clock of the first DU to the PRTC using the second reference timing information. The method may further include transmitting, by the first DU, third reference timing information to a second DU, wherein the second DU manages a second RU directly. The method may further include synchronizing, by the second DU, an internal clock of the second DU to the PRTC using the third reference timing information. The method may further include transmitting, by the second DU, fourth reference timing information to the second RU. The method may further include synchronizing, by the second RU, an internal clock of the second RU to the PRTC using the fourth reference timing information.

In some embodiments, the first RU, the first DU, the second DU, and the second RU are synchronized using the Precision Time Protocol (PTP). In some embodiments, the second RU is in communication with a third RU managed by the second DU, and the method further includes transmitting, by the second RU, fifth reference timing information to the third RU and synchronizing, by the third RU, an internal clock of the third RU to the PRTC with the fifth reference timing information.

In some embodiments, a Radio Access Network (RAN) is provided that includes: a first Radio Unit (RU); a Global Navigation Satellite System (GNSS) receiver that receives time signals from one or more GNSS transmitters and generates first timing information from the time signals; and a first Distributed Unit (DU) connected to the first RU, wherein the first DU manages the first RU. The first DU may include: a containerized Cell Site Router (cCSR) that routes user data, control data, or both between the first DU, the first RU, and one or more additional RUs of the RAN; and a timing Network Interface Card (NIC) connected to the GNSS receiver. The RAN may further include a second DU connected to the timing NIC of the first DU. In some embodiments, the timing NIC uses the first timing information from the GNSS receiver to set an internal clock of the timing NIC. In some embodiments, the timing NIC uses its internal clock to generate and transmit second timing information to the first RU. In some embodiments, the first RU uses the second timing information to synchronize an internal clock of the first RU to the internal clock of the timing NIC. In some embodiments, the timing NIC uses its internal clock to generate and transmit third timing information to the second DU. In some embodiments, the second DU uses the third timing information to synchronize an internal clock of the second DU to the internal clock of the timing NIC.

The RAN may further include a direct connection between the timing NIC and the first RU. In some embodiments, the second timing information is transmitted to the first RU via the direct connection. In some embodiments, the direct connection is an ethernet cable. In some embodiments, the timing NIC and the first RU use the Precision Time Protocol (PTP) to synchronize the internal clock of the first RU to the internal clock of the timing NIC. In some embodiments, the DU uses Frequency Division Duplexing (FDD), Time Division Duplexing (TDD), or both. In some embodiments, the first RU is part of a femtocell, a picocell, or a microcell.

The RAN may further include a second RU connected to and managed by the second DU. In some embodiments, the second DU transmits fourth timing information to the second RU and the second RU uses the fourth timing information to synchronize an internal clock of the second RU to the internal clock of the second DU, the internal clock of the timing NIC, or both. The RAN may further include a second RU managed by the first DU. In some embodiments, the timing NIC uses the internal clock to generate and transmit fourth timing information to the second RU and the second RU uses the fourth timing information to synchronize an internal clock of the second RU to the internal clock of the timing NIC. In some embodiments, the first RU transmits fourth timing information to the second RU and the second RU uses the fourth timing information to synchronize an internal clock of the second RU to the internal clock of the first RU, the internal clock of the timing NIC, or both.

In some embodiments, the first RU generates the fourth timing information from a signal of the internal clock of the first RU after synchronizing the internal clock of the first RU to the internal clock of the timing NIC. In some embodiments, the first RU transmits the fourth timing information to the second RU via a direct connection between the first RU and the second RU. In some embodiments, the first DU uses Frequency Division Duplexing (FDD) and the second DU uses Time Division Duplexing (TDD), or vice versa. In some embodiments, both the first DU and the second DU use Frequency Division Duplexing (FDD), or both the first DU and the second DU use Time Division Duplexing (TDD). In some embodiments, the first RU and the first DU are part of a 5G cellular network.

In some embodiments, a method of synchronizing components in a Radio Access Network (RAN) is provided. The method may include receiving, by a timing Network Interface Card (NIC) of a first Distributed Unit (DU), first timing information from a Global Navigation Satellite System (GNSS) receiver. The method may further include setting, by the timing NIC, an internal clock of the timing NIC using the first timing information. The method may further include generating and transmitting, by the timing NIC, second timing information to a first Radio Unit (RU), wherein the first RU is managed by the first DU. The method may further include synchronizing, by the first RU, an internal clock of the first RU to the internal clock of the timing NIC using the second timing information. The method may further include generating and transmitting, by the timing NIC, third timing information to a second DU, wherein the second DU is connected to the timing NIC of the first DU. The method may further include synchronizing, by the second DU, an internal clock of the second DU to the internal clock of the timing NIC using the third timing information.

In some embodiments, the second timing information is transmitted to the first RU via a direct connection between the timing NIC and the first RU. The method may further include generating and transmitting, by the first RU, fourth timing information to a second RU. The second RU may be connected to the first RU and managed by the first DU. The method may further include synchronizing, by the second RU, an internal clock of the second RU to the internal clock of first RU, the internal clock of the timing NIC, or both, using the fourth timing information.

In some embodiments, a Radio Access Network (RAN) is provided. The RAN may include: a first Radio Unit (RU); a second RU connected to the first RU; a Global Navigation Satellite System (GNSS) receiver that receives time signals from one or more GNSS transmitters and generates first timing information from the time signals; and a first Distributed Unit (DU) connected to the first RU. The first DU may manage the first RU. The first DU may include a containerized Cell Site Router (cCSR) that routes user data, control data, or both between the first DU, the first RU, and one or more additional RUs of the RAN; and a timing Network Interface Card (NIC) connected to the GNSS receiver. In some embodiments, the timing NIC uses the first timing information from the GNSS receiver to set an internal clock of the timing NIC. In some embodiments, the timing NIC uses its internal clock to generate and transmit second timing information to the first RU. In some embodiments, the first RU uses the second timing information to synchronize an internal clock of the first RU to the internal clock of the timing NIC. In some embodiments, the first RU uses its internal clock to generate and transmit third timing information to the second RU. In some embodiments, the second RU uses the third timing information to synchronize an internal clock of the second RU to the internal clock of the first RU, the internal clock of the timing NIC, or both.

The RAN may further include a second DU connected to the timing NIC of the first DU. In some embodiments, the timing NIC uses its internal clock to generate and transmit fourth timing information to the second DU and the second DU uses the fourth timing information to synchronize an internal clock of the second DU to the internal clock of the timing NIC. The RAN may further include a third RU connected to and managed by the second DU. In some embodiments, the second DU transmits fifth timing information to the second RU and the third RU uses the fifth timing information to synchronize an internal clock of the third RU to the internal clock of the second DU, the internal clock of the timing NIC, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Some embodiments pertain to S-plane configurations in different LLS configuration deployments. The S-plane addresses network topologies and timing accuracy limits for the fronthaul network connection between the O-RAN RUs and the DU(s). Due to port unavailability on the CSR, some embodiments use a combination of one or more synchronization configurations to provide timing synchronization in a fronthaul network. The combination of synchronization configurations described herein can provide accurate timing and synchronization when extending existing cell sites, or base stations, with additional fronthaul networks to support small cells, for example.

Figure 1:
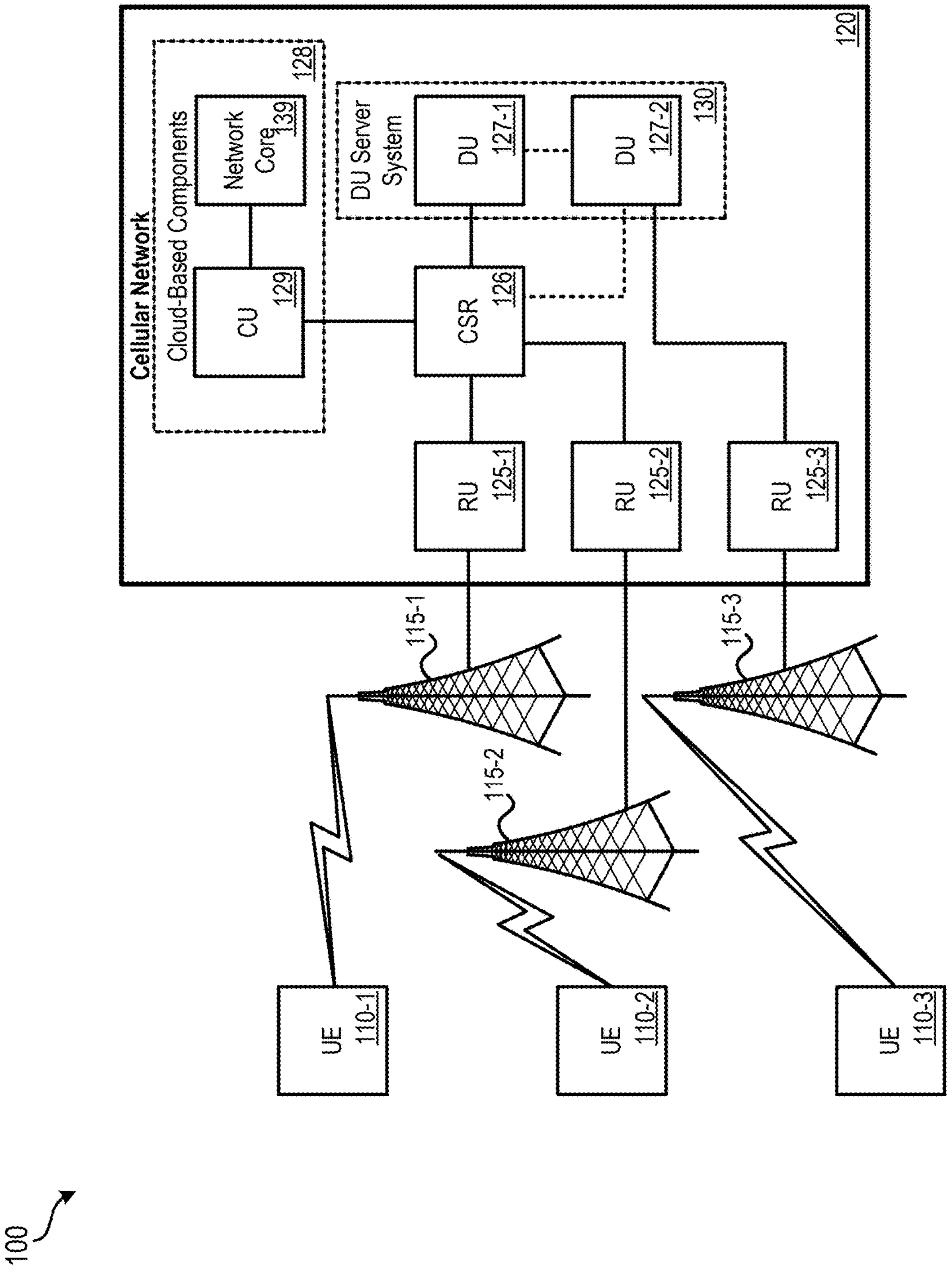
FIG. 1 illustrates an exemplary cellular network system, according to embodiments of the present invention.

FIG. 1 illustrates an embodiment of a cellular network system 100 ("system 100"). FIG. 1 represents an embodiment of a cellular network which can accommodate the architecture of FIGS. 2-5. System 100 can include a 5G New Radio (NR) cellular network; however, other types of cellular networks, such as 6G, may also be possible. System 100 can include: UE 110 (UE 110-1, UE 110-2, UE 110-3); antennas 115; and cellular network 120. Cellular network 120 can include: radio units 125 ("RUs 125"); cell site router 126 ("CSR 126"); distributed units 127 ("DUs 127"); centralized unit 129 ("CU 129"); and network core 139.

FIG. 1 represents a component-level view. In an open radio access network (O-RAN), because components can be implemented as specialized software executed on general-purpose hardware, except for components that need to receive and transmit Radio Frequency (RF) signals, the functionality of the various components can be shifted among different servers. For at least some components, the hardware may be maintained by a separate cloud-service provider to accommodate where the functionality of such components is needed, or a hybrid arrangement which can use an on-premises data center and cloud computing functionality.

UE 110 can represent various types of end-user devices, such as cellular phones, smartphones, cellular modems, cellular-enabled computerized devices, sensor devices, gaming devices, access points (APs), any computerized device capable of communicating via a cellular network, Internet of Things (IoT), etc. Generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. UE 110 may use RF to communicate with various base stations (BSs) of cellular network 120, including eNodeBs (eNBs) for 4G LTE and gNodeBs (gNBs) for 5G New Radio (NR).

BSs can include one or more of: antennas 115, RUs 125, and CSR 126. For example, a first BS may include: first antenna 115-1 and second antenna 115-2; first RU 125-1 and second RU 125-2; and CSR 126. Third antenna 115-3 and third RU 125-3 may be a part of first BS or a second BS. Antennas 115 may be mounted to a physical structure, such as a dedicated cellular tower, a building, a water tower, or any other man-made or natural structure to which one or more antennas can reasonably be mounted to provide cellular coverage to a geographic area or cell. BSs can provide cellular coverage to various types of cells, such as "small cells" and "macro cells".

Small cells are relatively small communications installations as compared to macro cells. Small cell radio equipment may be placed on streetlights, on or in buildings, on poles, in stadiums, etc. Small cells are typically installed much closer together than macro cells and in a relatively high density. Such high density placement also allows transmission of data at higher frequencies, which cannot travel as far as those of lower bands. Small cells may use broadband communications for backhaul, such as fiber, wireless, cable, or Digital Subscriber Line (DSL). These miniature radio Access Points (APs) or wireless network base stations have a relatively low Radio Frequency (RF) power output, footprint, and range as compared to macro cells. Small cells can be used to enhance macro communications networks by adding targeted capacity. Small cells include femtocells, picocells, and microcells. Femtocells are similar to wireless routers and may have a typical maximum range of approximately 10 meters. Picocells may have a range of up to 200 meters and may support up to 100 users. Picocells may be particularly well suited for stadiums, hospitals, airports, train stations, etc. Microcells can have a range of up to 2 kilometers, and are frequently attached to buildings, traffic lights, poles, etc.

Real-world implementations of system 100 can include many (e.g., thousands) of BSs and many CUs and network cores. Antennas 115 may allow RUs 125 to communicate wirelessly with UEs 110. RUs 125 can represent an edge of cellular network 120 where data is transitioned to RF for wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture.

One or more RUs, such as RUs 125, may communicate with one or more DUs 127 via one or more routers, such as CSR 126. For example, and as illustrated, first RU 125-1 and second RU 125-2 may each be connected to, and/or managed by, first DU 127-1 via CSR 126. Additionally, or alternatively, the functionality of a CSR may be virtualized and executed by a DU. For example, CSR 126 may be implemented as a containerized virtualization in either, or both, of first DU 127-1 and second DU 127-2. A single DU may be connected to RUs at multiple cell sites or BSs. Different RUs may be present for different portions of the spectrum and/or different cells provided by a BS. For instance, a first RU may operate on the spectrum in the citizens broadcast radio service (CBRS) band while a second RU may operate on a separate portion of the spectrum, such as, for example, band 71. In some embodiments, an RU can also operate on three bands. Collectively, a DU and the RUs it controls/manages, form a fronthaul network.

Components of a fronthaul network (e.g., a DU and its respective RUs) can be synchronized in any one, or a combination, of configurations. In a first LLS configuration ("LLS-C1"), the DU of a fronthaul network acts as the Telecom Grandmaster (T-GM) for the RUs it manages, with the network timing being distributed to the RUs via a direct connection between the DU and the RU. In a second LLS configuration ("LLS-C2"), the DU still acts as the T-GM for the RUs it manages, but the network timing is distributed to the RUs via one or more intermediary components acting as Telecom Boundary Clocks (T-BCs), such as an ethernet switch or router. In a third configuration ("LLS-C3"), both the DU, and the RUs it manages, are configured to act as Telecom Slave Clocks (T-TSCs) that receive network timing information from a T-GM or Primary Reference Time Clock (PRTC), such as a CSR. As described further herein, these configurations can be modified, adapted, and/or combined to support additional scalability within and across base stations and/or fronthaul networks.

As described herein, network timing, reference timing information, timing synchronization information, or just timing information, may refer to communications transmitted between a primary clock and a secondary clock as part of a clock synchronization protocol. In some embodiments, the timing information is transmitted For example, RUs in a fronthaul network may use the Precision Time Protocol (PTP) defined in the Institute of Electrical and Electronics Engineers (IEEE) 1588 standard to synchronize their internal clocks to the internal clock of the DU that manages their operations. In turn, the DU may use PTP to synchronize its internal clock to a PRTC, such as a CSR, that is synchronized to a reference time, such as Greenwich Mean Time (GMT) or Coordinated Universal Time (UTC). Additionally, or alternatively, the components of a fronthaul network may use the Synchronous Ethernet (SyncE) as defined by the International Telecommunication Union (ITU) in recommendation G.8262. For example, the reference timing information may be embedded in an electrical signal carrying user data, control data, or both.

One or more DUs, such as DUs 127, may communicate directly with CU 129 or via CSR 126. Collectively, an RU, DU, and CU create a gNodeB of a radio access network (RAN) of cellular network 120. DUs 127 and CU 129 can communicate with network core 139. The specific architecture of cellular network 120 can vary by embodiment. Edge cloud server systems outside of cellular network 120 may communicate, either directly, via the Internet, or via some other network, with components of cellular network 120. For example, DU 127 may be able to communicate with an edge cloud server system without routing data through CU 129 or network core 139. Other DUs may or may not have this capability.

While FIG. 1 illustrates various components of cellular network 120, other embodiments of cellular network 120 can vary the arrangement, communication paths, and specific components of cellular network 120. While RUs 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DUs 127, CU 129, and network core 139. As such, functionality of components such as DUs and CUs can be co-located or distributed across disparate physical server systems. For example, certain components of network core 139 may be co-located with components of CU 129.

As illustrated, DUs 127 may be executed by DU server system 130. DU server system 130 may include one or more physical and/or virtual machines configured to execute some or all of the functions of DU 127. For example, DU server system 130 may include a cluster of one or more physical servers. Specialized software that performs the logical functions of one or more DUs, such as DUs 127, may be executed directly by the operating system of the one or more physical servers. Additionally, or alternatively, a cluster of one or more virtual machines may be instantiated across the cluster of one or more physical servers. The specialized software that performs the logical functions of the one or more DUs may then be installed within, and executed by, the virtual machines. As described further herein, specialized software that performs the logical functions of CSRs, such as CSR 126, may also be executed by DU server system 130 and/or an implementation of a DU, such as DU 127-1 or DU 127-2.

In a possible O-RAN implementation, DUs 127, CU 129, CSR 126, and/or network core 139 can be implemented virtually as software being executed by general-purpose computing equipment, such as in a data center, as detailed herein. Therefore, depending on needs, the functionality of a DU, CU, CSR, and/or network core may be implemented locally to each other and/or specific functions of any given component can be performed by physically separated server systems (e.g., at different server farms). For example, the physical machines of DU server system 130 may be located at or near the one or more BSs for which they are intended to support. In some embodiments, the distance is selected to ensure that the transmission time between the DU server system and any of the BSs for which it is intended to provide DU functionalities meets minimum latency requirements.

As another example, some functions of a CU may be located at a same server facility as DU server system 130, while other functions are executed at a separate server system or on a public or private cloud computing system. In the illustrated embodiment of system 100, cloud-based cellular network components 128 include CU 129 and network core 139. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, Docker®, or a similar container orchestration platform, can be used to create and destroy the logical DU, CU, CSR, or network core units and subunits as needed for the cellular network to function properly. Kubernetes allows for container deployment, scaling, and management. As an example, if cellular traffic increases substantially in a region, an additional logical CU or components of a CU may be deployed in a data center near where the traffic is occurring without any new hardware being deployed. Rather, processing and storage capabilities of the data center would be devoted to the needed functions. When the need for the logical CU or subcomponents of the CU no longer exists, Kubernetes can allow for removal of the logical CU. In addition to scalability, Kubernetes can also be used for failure management of various components of cellular network 120, as described further herein. Kubernetes can also be used to control the flow of data (e.g., messages) and inject a flow of data to various components. This arrangement can allow for the modification of nominal behavior of various layers.

Figure 2:
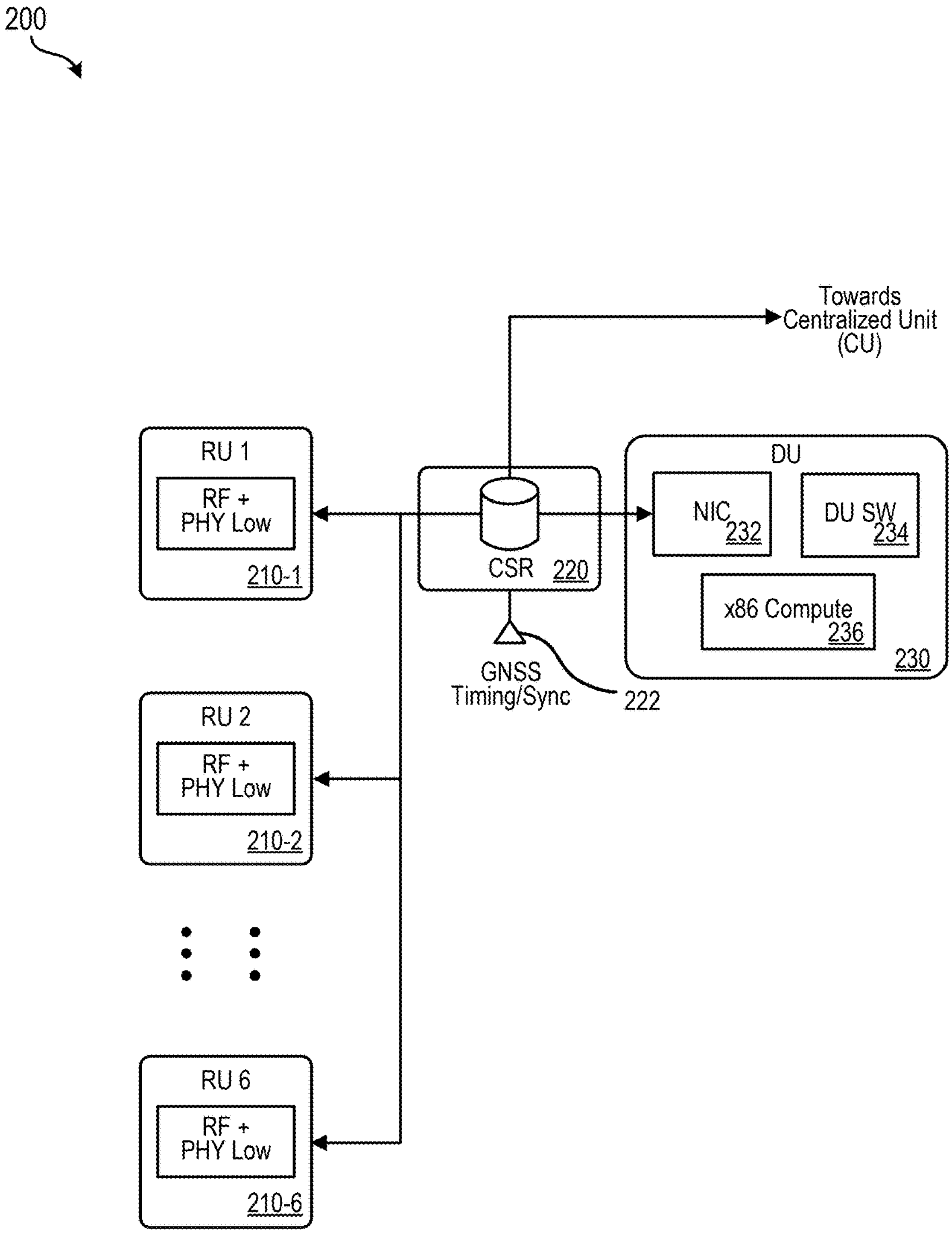
FIG. 2 is an architectural diagram of a RAN, according to embodiments of the present invention.

FIG. 2 is an architectural diagram of a RAN 200. RAN 200 includes six RUs 210 (e.g., first RU 210-1 and second RU 210-2 through sixth RU 210-6), each of which has respective RF equipment and performs the lower part of the physical layer (PHY low) processing. PHY low includes precoding, beamforming, Inverse Fast Fourier Transform (IFFT) and Control Plane (CP), and Digital-to-Analog Converter (DAC) and Analog-to-Digital Converter (ADC) functionality. CSR 220 serves as a PRTC and provides grandmaster timing (i.e., T-GM) using Global Navigation Satellite System (GNSS) receiver 222. CSR 220 may use a combination of timestampers, advanced Phase Lock Loops (PLLs), robust software for Precision Time Protocol (PTP) support, and precision oscillator(s) to satisfy network synchronization limits.

CSR 220 distributes timing information to RUs 210 as well as to Network Interface Card (NIC) 232 of DU 230. NIC 232 has time synchronization capabilities and can be used for both fronthaul interfaces, with suitable clock circuits that provide NIC 232 with the clock signals required by digital processing tasks. DU software (DU SW) 234 controls the operations of DU 230 (e.g., performing PHY high functionality) and is executed by x86 processor(s) 236. While described herein as being executed by x86 processor(s), the functionalities of DU SW 234 may additionally, or alternatively, be provided by any one, or a combination, of processors and/or processor architectures, including Advanced RISC Machines (ARM), Reduced Instruction Set Computer (RISC)-V, Power Performance Computing (PowerPC), Scalable Processor Architecture (SPARC), Microprocessor without Interlocked Pipeline Stages (MIPS), or any other suitable processor architecture. As described above, RUs 210 and DU 230 may be synchronized with each other in a similar manner as the LLS-C3 synchronization configuration, with RUs 210 and DU 230 each synchronizing their internal clocks (e.g., as secondary clocks) to the internal clock of CSR 220 (e.g., acting as T-GM and/or PRTC).

In some embodiments, additional fronthaul networks including one or more DUs and respective pluralities of RUs can be deployed at a same base station or cell site as RAN 200 to extend the capabilities and/or coverage provided by RAN 200 and/or the cell site as a whole. For example, additional DUs and RUs can be connected to available ports of CSR 220 and synchronized with CSR 220 in a similar manner as RUs 210 and DU 230. In some embodiments, the number of physical ports on a CSR, such as CSR 220, are limited. As a result, expanding RAN 200 to include additional RUs and/or DUs while maintaining the same synchronization configuration (e.g., LLS-C3) may require the installation of a new CSR that includes additional ports. This solution can be very expensive and/or labor intensive due to the time and effort associated with physically replacing CSRs across an entire network. To address the shortcomings associated with limited CSR port availability, RANs can be implemented with multiple synchronization configurations supported by existing CSRs. For example, a RAN with multiple fronthaul networks (e.g., multiple DUs), can use a combination of synchronization configurations. Additionally, or alternatively, RANs can be implemented with one or more synchronization configurations supported by a virtual, or containerized, CSR, as described further herein.

Figure 3:
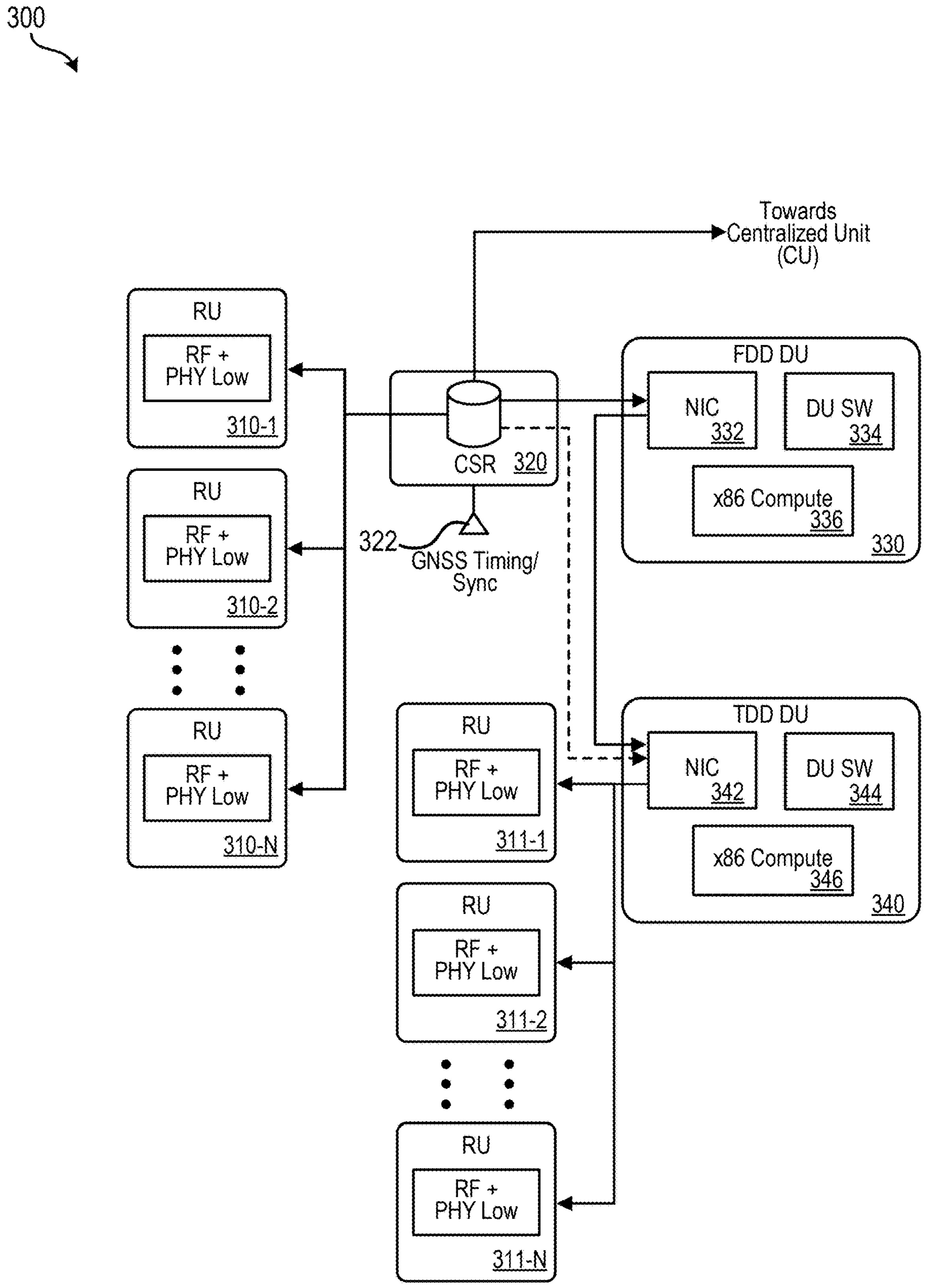
FIG. 3 is an architectural diagram of a RAN with dual synchronization configurations for multiple DUs, according to embodiments of the present invention.

FIG. 3 is an architectural diagram of a RAN 300 with dual synchronization configurations for multiple DUs. As illustrated, RAN 300 includes: first RUs 310 (i.e., first RU 310-1 and second RU 310-2 through Nth RU 310-N); CSR 320; and FDD DU 330. First RUs 310 may be managed or controlled by FDD DU 330. FDD DU 330 may include the same or similar components and/or functionality as DU 230 described above, such as NIC 332, DU SW 334, and x86 processor(s) 336.

The fronthaul network including first RUs 310, CSR 320 and FDD DU 330 may be synchronized according to a first synchronization configuration. For example, and as described above in relation to RAN 200, CSR 320 may serve as a PRTC and provide grandmaster timing using GNSS receiver 322 to FDD DU 330 and first RUs 310. In this configuration, first RUs 310 and FDD DU 330 act as T-TSC to CSR 320 acting as T-GM. As further described above, it could be said that first RUs, CSR 320, and FDD DU 330 are synchronized according to the LLS-C3 synchronization configuration.

As further illustrated, RAN 300 includes second RUs 311 (i.e., first RU 311-2 and second RU 311-2 through Nth RU 311-N) and TDD DU 340. TDD DU 340 may include the same or similar components and/or functionality as FDD DU 330, such as NIC 342, DU SW 344, and x86 processor (s) 346. NIC 342 of TDD DU 340 may be connected to CSR 320 and/or NIC 332 of FDD DU 330.

In some embodiments, NIC 332 of FDD DU 330 provides timing synchronization information to NIC 342 of TDD DU 340. In this way, FDD DU 330 may act as a T-BC between CSR 320 and TDD DU 340. Alternatively, and as indicated by the dashed line, TDD DU 340 may receive timing synchronization information directly from CSR 320. Once synchronized, NIC 342 of TDD DU 340 may transmit timing synchronization information directly to second RUs 311. In this way, TDD DU 340 and second RUs 311 are synchronized in a similar manner as in the LLS-C1, in that TDD DU 340 provides timing synchronization information directly to second RUs 311, except that TDD DU 340 also acts as a T-BC between CSR 320 and/or FDD DU 330 and second RUs 311, rather than a T-GM itself.

By configuring TDD DU 340 as a T-BC between CSR 320 and/or FDD DU 330 and second RUs 311, the carrier can avoid upgrading CSR 320 to have more ports or installing additional CSRs, both of which increase cost. It should be noted that the DUs could be of any type in some embodiments (e.g., two FDD DUs, two TDD DUs, or one of each type). Additionally, while first RUs 310 and second RUs 311 are illustrated and described as acting as T-TSCs, one or more of first RUs 310, and/or one or more of second RUs 311, may be configured as a T-BC to other RUs. For example, first RU 310-1 may be configured to act as a T-BC between CSR 320 and second RU 310-2. Second RU 310-2 may then in turn be configured to act as a T-BC between first RU 310-1 and another RU of first RUs 310.

Figure 4:
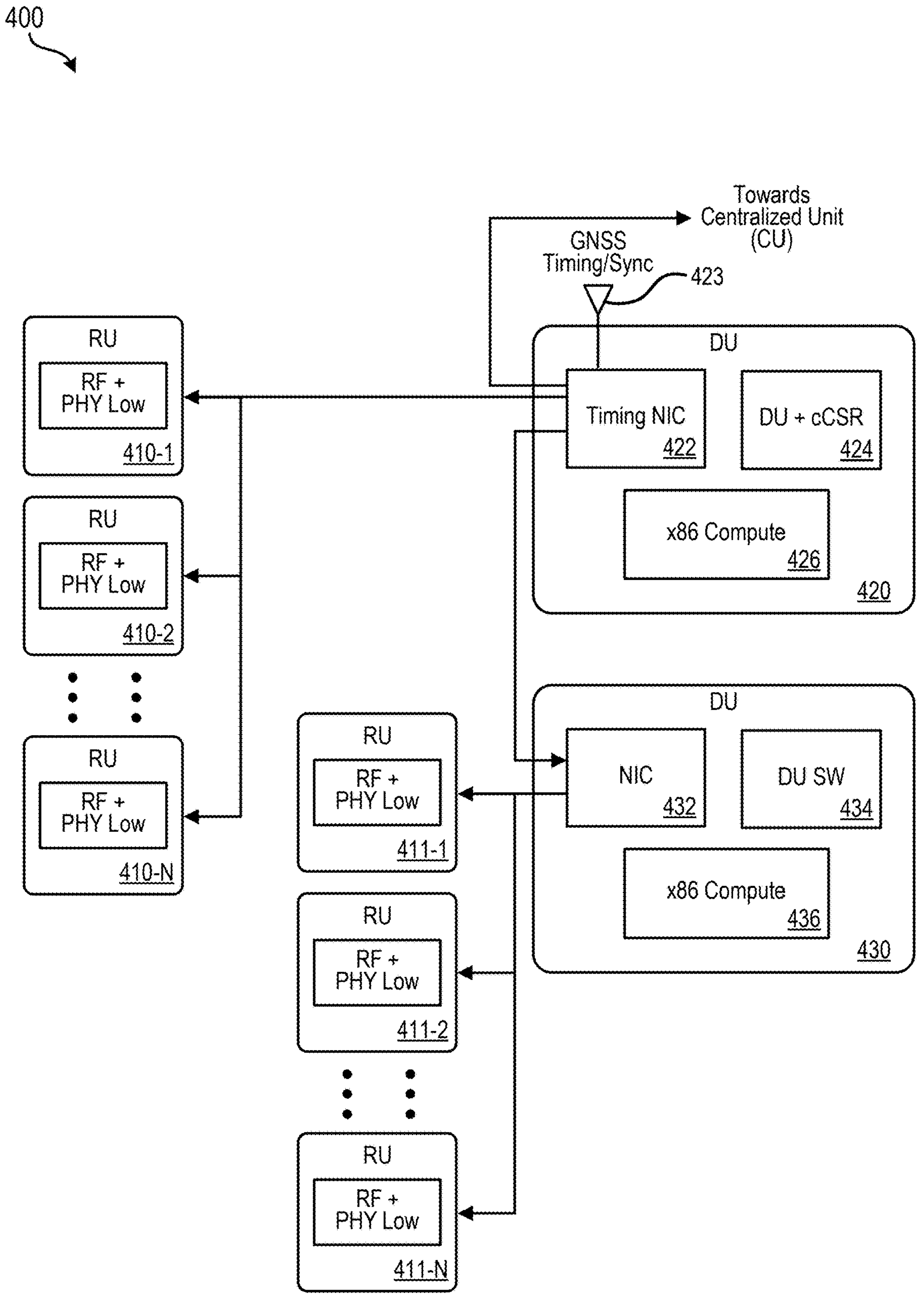
FIG. 4 is an architectural diagram of a RAN configuration supported by a containerized CSR with an optional dual synchronization configuration, according to embodiments of the present invention.

In some embodiments, RANs are deployed with a virtual, or containerized, CSR, rather than a physical CSR. FIG. 4 is an architectural diagram of a RAN 400 supported by a containerized CSR (cCSR) with an optional dual synchronization configuration. RAN 400 includes first RUs 410 (e.g., first RU 410-1 and second RU 410-2 through Nth RU 410-N) and first DU 420, with first DU 420 managing the operations of first RUs 410. Unlike RAN 300 of FIG. 3, RAN 400 does not include a separate physical CSR. Instead, first DU 420 (which may be a TDD DU, an FDD DU, or both) includes timing NIC 422 with its own GNSS receiver 423 that is configured to serve as a PRTC and function as a T-GM. DU 420 also has DU and cCSR software 424 ("DU+cCSR SW 424) that performs CSR operations in addition to typical DU operations. Including timing NIC 422 in first DU 420 may enable first DU 420 to act as a T-GM for first RUs 410. As further illustrated, first DU 420 also includes x86 processor(s) 426 that execute DU+CSR SW 424. Timing NIC 422 may transmit timing information directly to first RUs 410 without a physical switch or router, similar to the LLS-C1 synchronization configuration.

As further illustrated, RAN 400 includes second RUs 411 (e.g., first RU 411-1 and second RU 411-2 through Nth RU 411-N) and second DU 430. Second DU 430 (which may be a TDD DU, an FDD DU, or both) may include NIC 432, as well as DU SW 434 executed by x86 processor(s) 426. As illustrated, NIC 432 of second DU 430 may be connected to timing NIC 422 of first DU 420. NIC 432 and/or second DU 430 may be configured to act as a T-BC between first DU 420 and second RUs 411. In other words, once synchronized to timing NIC 422 of first DU 420, NIC 432 of second DU 430 may transmit timing synchronization information directly to second RUs 411, similar to the LLS-C1 synchronization configuration. However, because second DU 430 may act as a T-BC between first DU 420 and second RUs 411, this configuration could also be considered as a hybrid between the LLS-C1 and LLS-C2 synchronization configurations.

Figure 5:
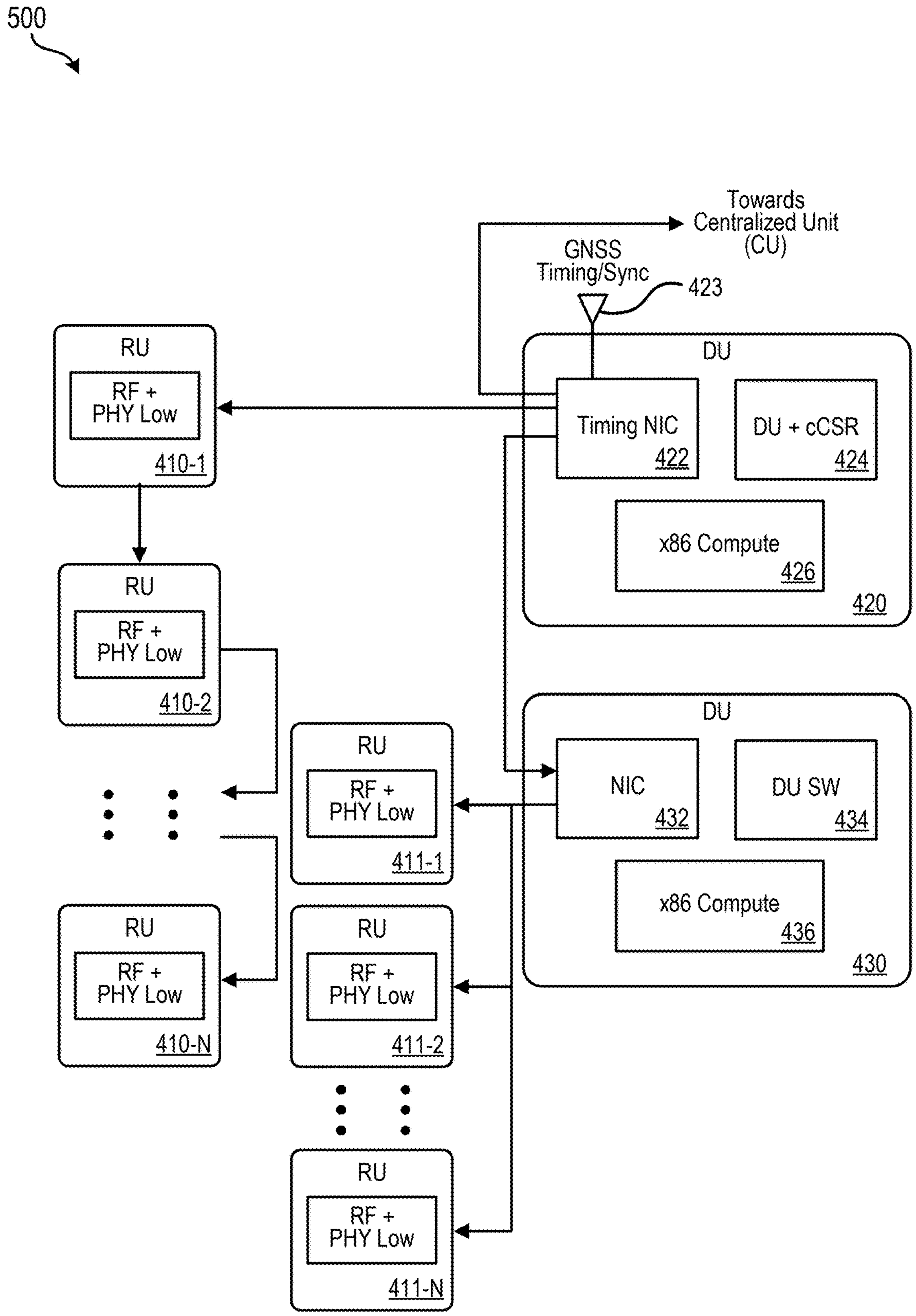
FIG. 5 is another architectural diagram of a RAN configuration supported by a containerized CSR with multiple dual synchronization configurations, according to embodiments of the present invention.

FIG. 5 is another architectural diagram of a RAN 500 supported by a containerized CSR with multiple synchronization configurations. RAN 500 may include some or all of the same components as RAN 400 described above, such as first RUs 410, first DU 420, second RUs 411, and second DU 430. As further illustrated, first RU 410-1 may be synchronized with first DU 420 in a similar manner as the LLS-C1 synchronization configuration, with first DU 420 transmitting timing synchronization information directly to first RU 410-1. However, unlike RAN 400, the remaining RUs of first RUs 410 may be synchronized with first DU 420 in a similar manner as the LLS-C2 synchronization configuration. For example, and as illustrated, second RU 410-2 may be synchronized with first DU 420 via first RU 410-1 acting as a T-BC between first DU 420 and second RU 410-2. Timing synchronization may then cascade from one RU to the next in a daisy chain, with each preceding RU acting as a T-BC until Nth RU 410-N is synchronized by the N−1 RU. In some embodiments, the LLS-C2 RU cascade architecture may be used for microcells or other small cells. If a centralized or distributed DU is desired instead of having multiple fronthauls (i.e., one coming from each RU), the RUs can be cascaded with a single fronthaul into the first RU. Second RUs 411 may be synchronized with second DU 430 in a similar manner as the LLS-C1 synchronization configuration, with second DU 430 acting as the T-GM for each of second RUs 411, or in a similar cascading manner as first RUs 410.

Figure 6:
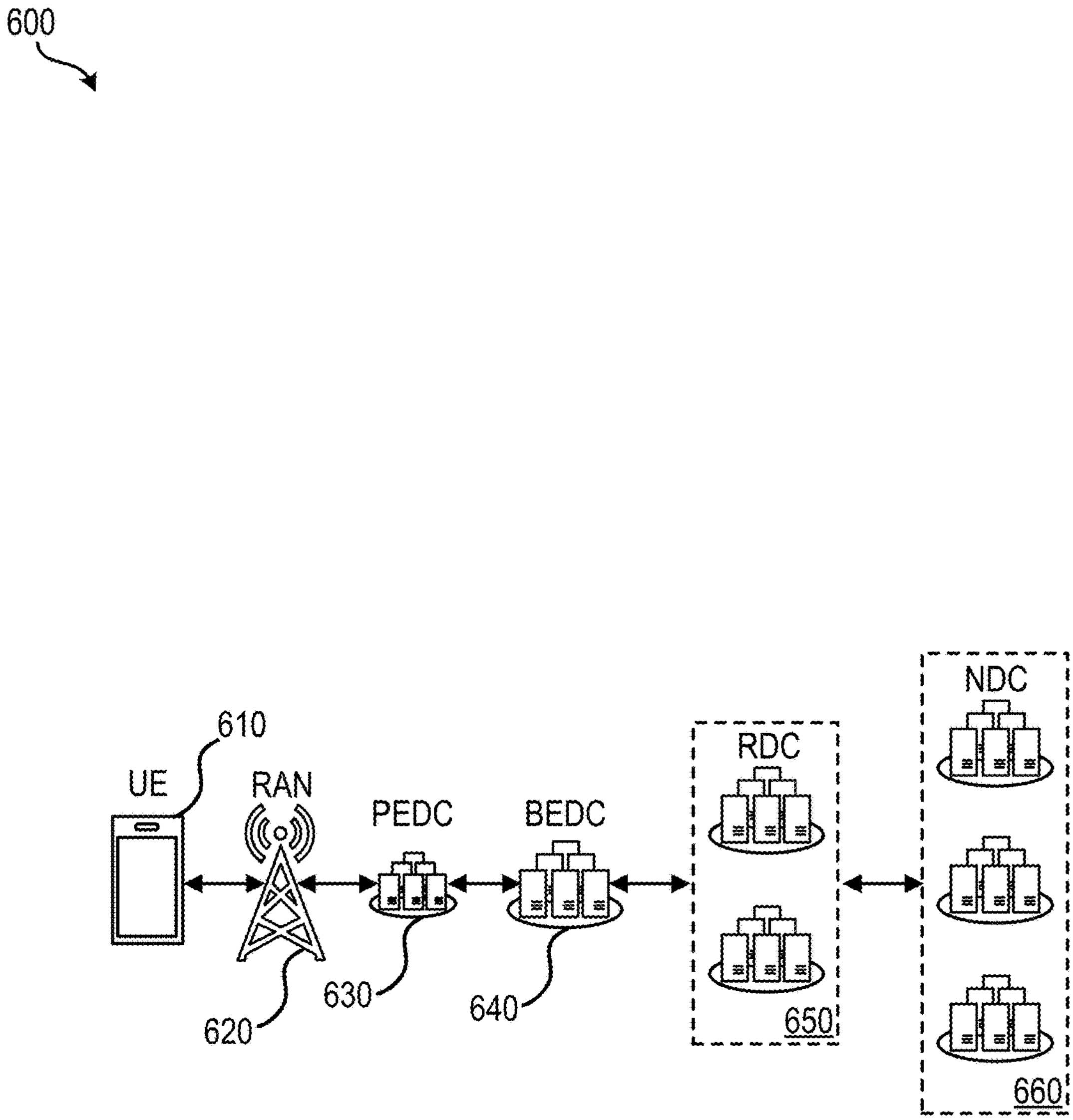
FIG. 6 is an architectural diagram illustrating a telecommunications system, according to embodiments of the present invention.

FIG. 6 is an architectural diagram illustrating a telecommunications system 600, according to embodiments of the present invention. User equipment (UE) 610 (e.g., a mobile phone, a tablet, a laptop computer, etc.) communicates with RAN 620. RAN 620 includes the devices discussed above, such as RUs, DU(s), etc., and may include the LLS configurations of FIG. 2, 3, 4, or 5, for example. RAN 620 may include small cells in some embodiments.

RAN 620 sends communications to UE 610, as well as from UE 610 into the core carrier network. In some embodiments, communications are sent to/from RAN 620 via a PEDC 630 to provide lower latency. However, in some embodiments, RAN 620 communicates directly with a BEDC 640. BEDCs are typically smaller data centers that are proximate to the populations they serve. BEDCs may break out User Plane Function data traffic (UPF-d) packets and provide cloud computing resources and cached content to UE 610, such as providing Near Field (NF) application services for gaming, enterprise applications, etc. In certain embodiments, RAN 620 may include an LDC (not shown) that hosts one or more DUs in a 5G O-RAN architecture. The CU may be located in the LDC or BEDC 640, for example. LDCs, PEDCs, and/or BEDCs may provide Mobile Edge Computing (MEC) services in some embodiments.

The carrier network may provide various NFs and other services. For instance, BEDC 640 may provide cloud computing resources and cached content to mobile device 610, such as providing NF application services for gaming, enterprise applications, etc. A Regional Data Center (RDC) 650 may provide core network functions, such as UPF for voice traffic (UPF-v), UPF-d (if not in BEDC 640, for example), Session Management Function (SMF), and Access and Mobility Management Function (AMF) functionality. The SMF includes Packet Data Network Gateway (PGW) Control Plane (PGW-C) functionality. The UPF includes PGW User Data Plane (PGW-U) functionality.

A National Data Center (NDC) 660 may provide a Unified Data Repository (UDR) and user verification services, for example. Other network services that may be provided may include, but are not limited to, Internet Protocol (IP) Multimedia Subsystem (IMS)+Telephone Answering Service (TAS), IP-SM Gateway (IP-SM-GW) (i.e., the network functionality that provides the messaging service in the IMS network), Location Management Function (LMF), Gateway Mobile Location Center (GMLC), Enhanced Serving Mobile Location Center (E-SMLC) for former generation wireless networks, Location Retrieval Function (LRF), Home Location Register (HLR), Home Subscriber Server (HSS), UPF+PGW-U, AMF, HSS+UDM, Authentication Server Function (AUSF), SMF+PGW-C, Short Message Service Center (SMSC), Policy Control Function (PCF), MEC, Network Exposure Functions (NEFs) or Common Application Programming Interface (API) Framework (CAPIF) for 3rd Generation Partnership Project (3GPP) northbound APIs, Network Slice Selection Function (NSSF), Non-3GPP InterWorking Function (N3IWF), Network Data Analytics Function (NWDAF), Mediation and Delivery Function (MDF), Service Communication Proxy (SCP), and/or Security Edge Protection Proxy (SEPP) functionality. It should be noted that additional and/or different network functionality may be provided without deviating from the present invention. The various functions in these systems may be performed using dockerized clusters in some embodiments.

BEDC 640 may utilize other data centers for NF authentication services. RDC 650 receives NF authentication requests from BEDC 640. RDCs 650 may help with managing user traffic latency, for instance. However, RDCs 650 may not perform NF authentication in some embodiments. From RDCs 650, NF authentication requests may be sent to NDC 660, which may be located far away from UE 610, RAN 620, PEDC 630, BEDC 640, and RDCs 650.

Figure 7:
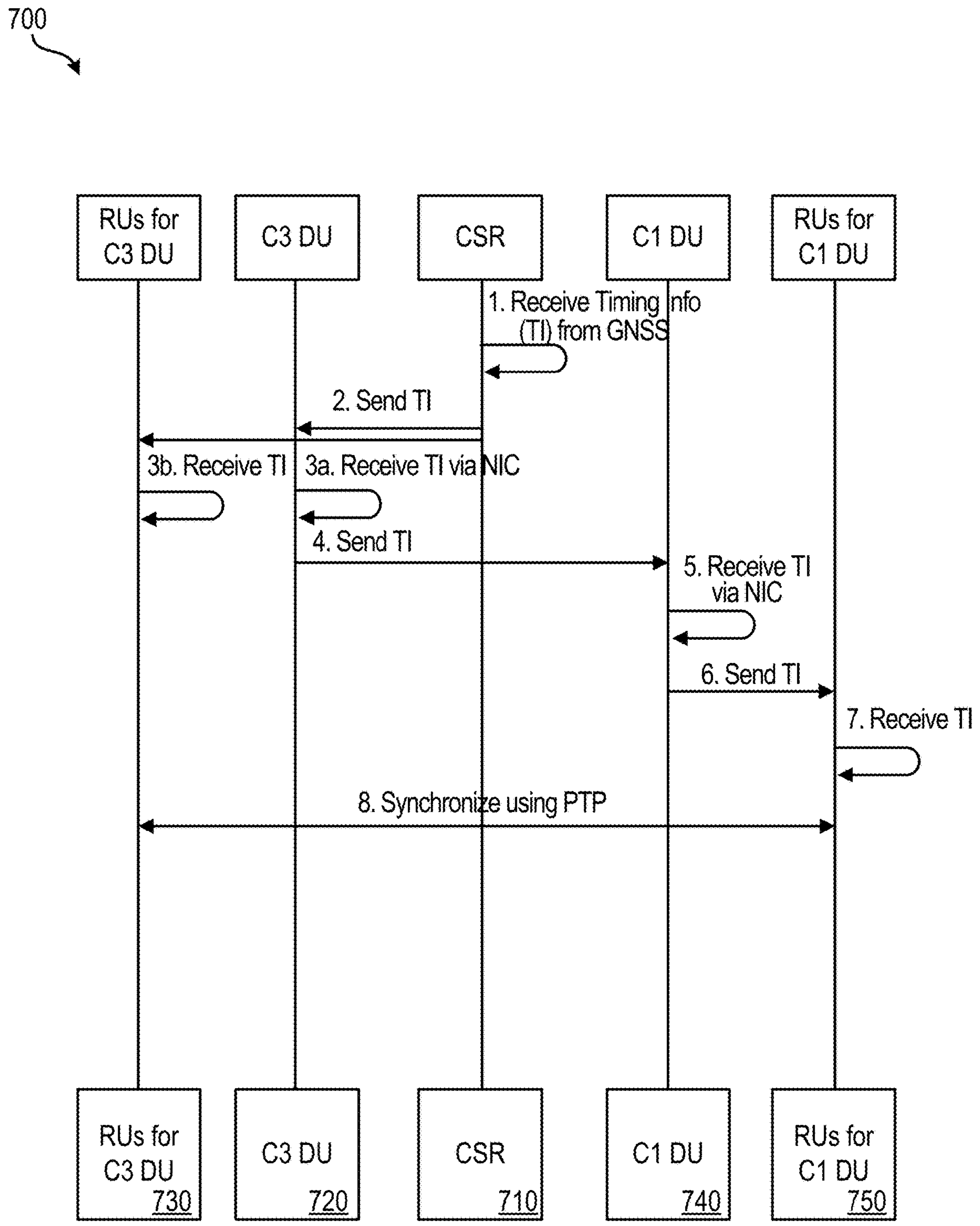
FIG. 7 is a sequence diagram illustrating clock synchronization interactions between components of a RAN with dual synchronization configurations for multiple DUs, according to embodiments of the present invention.

FIG. 7 is a sequence diagram illustrating a timing synchronization sequence 700 in a RAN with dual synchronization configurations for multiple DUs. Timing synchronization sequence 700 may include operations performed by one or more components of a RAN, such as RAN 300 described above. For example, the RAN may include CSR 710, first RUs 730 managed by first DU 720, and second RUs 750 managed by second DU 740. As illustrated, timing synchronization sequence 700 may begin with CSR 710 receiving timing information from a GNSS receiver. CSR 710 may then synchronize its internal clock to the reference time signal provided by the GNSS receiver. Once synchronized, timing synchronization sequence 700 may proceed with CSR 710 transmitting timing synchronization information to first DU 720 and first RUs 730. In this way, first DU 720 and first RUs 730 may be synchronized to CSR 710 in a similar manner as the LLS-C3 synchronization configuration.

Once first DU 720 is synchronized to CSR 710, timing synchronization sequence 700 may proceed with first DU 720 transmitting timing synchronization information to second DU 740. Second DU 740 may then receive the timing synchronization information from first DU 720 and synchronize its internal clock to that of first DU 720. Once second DU 740 is synchronized with first DU 720, second DU 740 may transmit timing synchronization information directly to second RUs 750, who may then synchronize their internal clocks to that of second DU 740. In this way, second DU 740 and second RUs 750 may be synchronized with each other in a similar manner as the LLS-C1 synchronization configuration. As further described above, by utilizing dual configurations (e.g., the LLS-C3 synchronization configuration for first RUs 730 and first DU 720, and the LLS-C1 synchronization configuration for second RUs 750 and second DU 740), the RAN can support the addition of second RUs 750 and second DU 740 without using additional ports on CSR 710, or without requiring a new CSR that has additional ports, for each of second RUs 750 and second DU 740.

Figure 8:
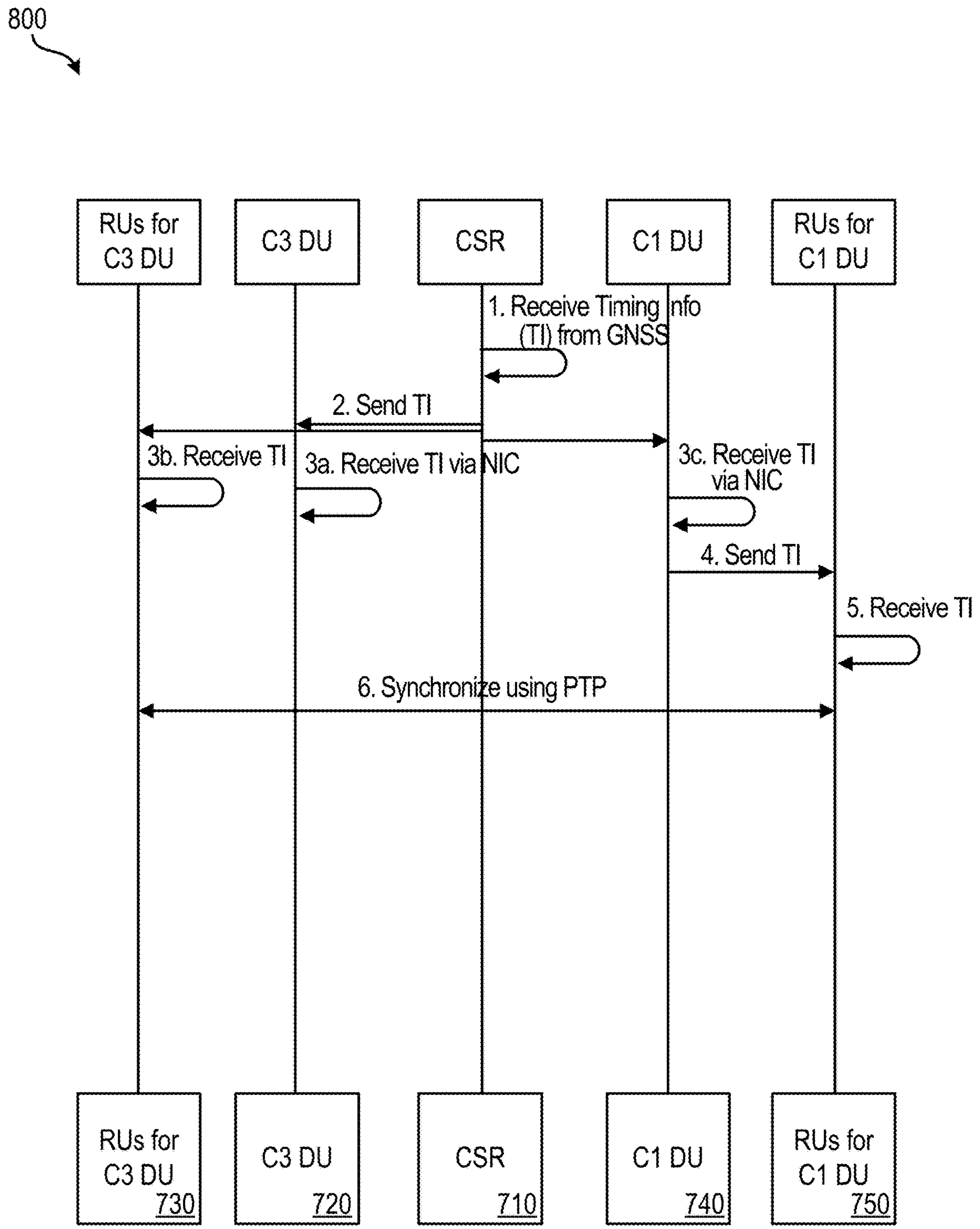
FIG. 8 is another sequence diagram illustrating clock synchronization interactions between components of a RAN with dual synchronization configurations for multiple DUs, according to embodiments of the present invention.

FIG. 8 is another sequence diagram illustrating another timing synchronization sequence 800 in a RAN with dual synchronization configurations for multiple DUs. Timing synchronization sequence 800 may include operations performed by the same or similar components of a RAN as described above in relation to timing synchronization sequence 700. For example, and as illustrated, timing synchronization sequence 800 may begin with CSR 710 receiving timing information from a GNSS receiver. CSR 710 may then synchronize its internal clock to the reference time signal provided by the GNSS receiver. Once synchronized, timing synchronization sequence 800 may proceed with CSR 710 transmitting timing synchronization information to first DU 720 and first RUs 730, as well as second DU 740. Once the timing synchronization information is received, first DU 720, first RUs 730, and second DU 740 may be synchronized to CSR 710 in a similar manner as the LLS-C3 synchronization configuration.

Once second DU 740 is synchronized with CSR 710, second DU 740 may transmit timing synchronization information directly to second RUs 750, who may then synchronize their internal clocks to that of second DU 740. In this way, second DU 740 and second RUs 750 may be synchronized with each other in a similar manner as the LLS-C1 synchronization configuration. As further described above, by utilizing dual configurations (e.g., the LLS-C3 synchronization configuration for first RUs 730, first DU 720, and second DU 740, as well as the LLS-C1 synchronization configuration for second RUs 750 and second DU 740), the RAN can support the addition of second RUs 750 and second DU 740 using only one additional port on CSR 710 for the connection between CSR 710 and second DU 740, without requiring additional ports for each of second RUs 750.

Figure 9:
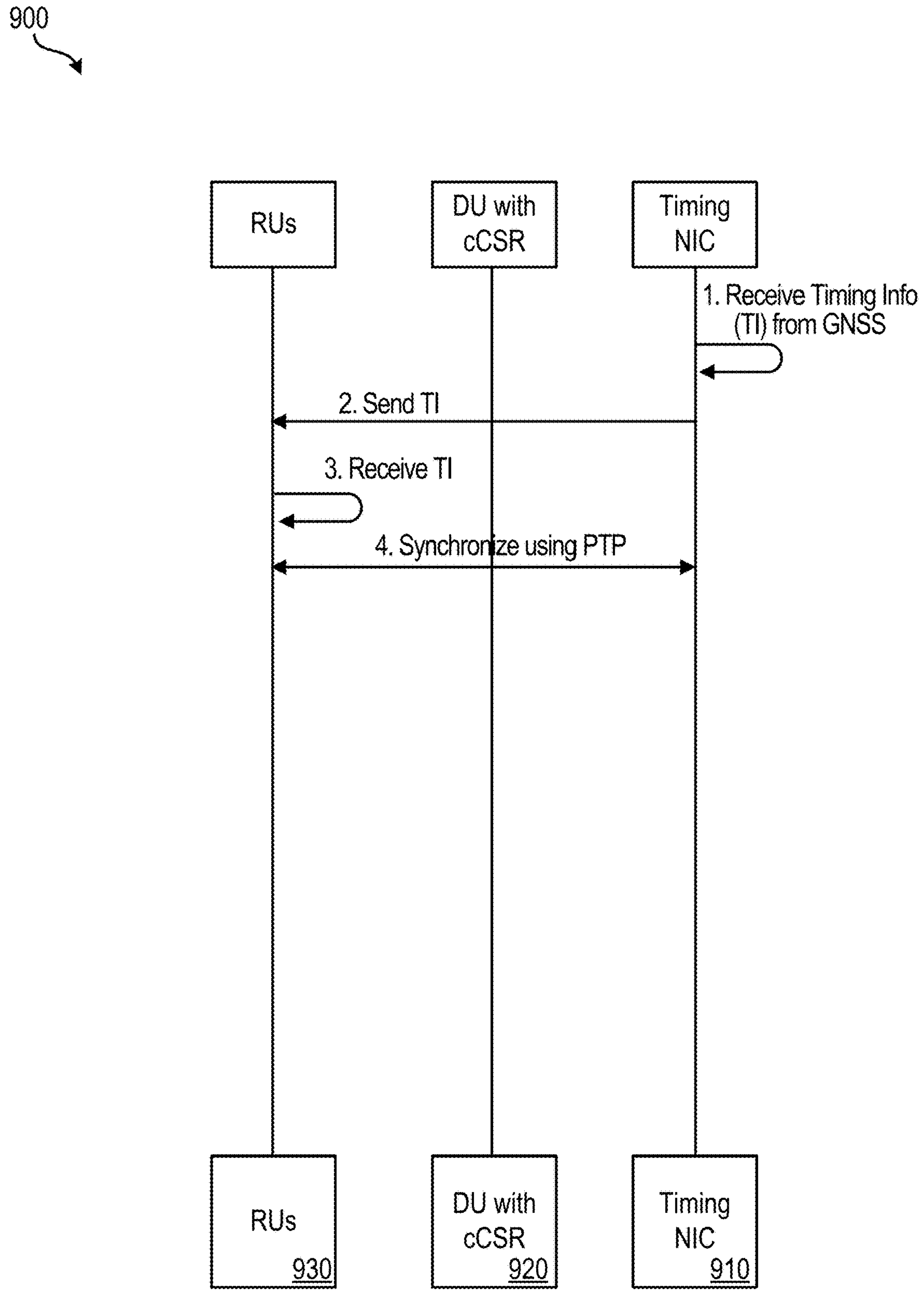
FIG. 9 is sequence diagram illustrating clock synchronization interactions between components of a RAN configuration supported by a containerized CSR, according to embodiments of the present invention.

FIG. 9 is sequence diagram illustrating a timing synchronization sequence 900 in a RAN configuration supported by a containerized CSR. Timing synchronization sequence 900 may include operations performed by one or more components of a RAN, such as RAN 400 and/or RAN 500 described above. For example, the RAN may include timing NIC 910, DU 920, and first RUs 930 managed by DU 920. While illustrated as separate components, DU 920 may include timing NIC 910, as described above in reference to RAN 400. As illustrated, timing synchronization sequence 900 may begin with timing NIC 910 receiving timing information from a GNSS receiver. Timing NIC 910 may then synchronize its internal clock to the reference time signal provided by the GNSS receiver. Once synchronized, timing synchronization sequence 900 may proceed with timing NIC 910 transmitting timing synchronization information directly to first RUs 930. In this way, DU 920 and first RUs 930 may be synchronized with each other in a similar manner as the LLS-C1 synchronization configuration.

While not illustrated, timing synchronization sequence 900 may further proceed with timing NIC 910 transmitting timing synchronization information to one or more second DUs. Once received, the one or more second DUs may synchronize their internal clocks to timing NIC 910 of first DU 920. Once synchronized, each of the one or more second DUs may proceed to transmit timing synchronization information to a respective sets of RUs managed by the second DU. In this way, each of the respective sets of RUs may be synchronized to the DU to which they are connected, as well as first DU 920, in a similar manner as the LLS-C2 synchronization configuration.

Figure 10:
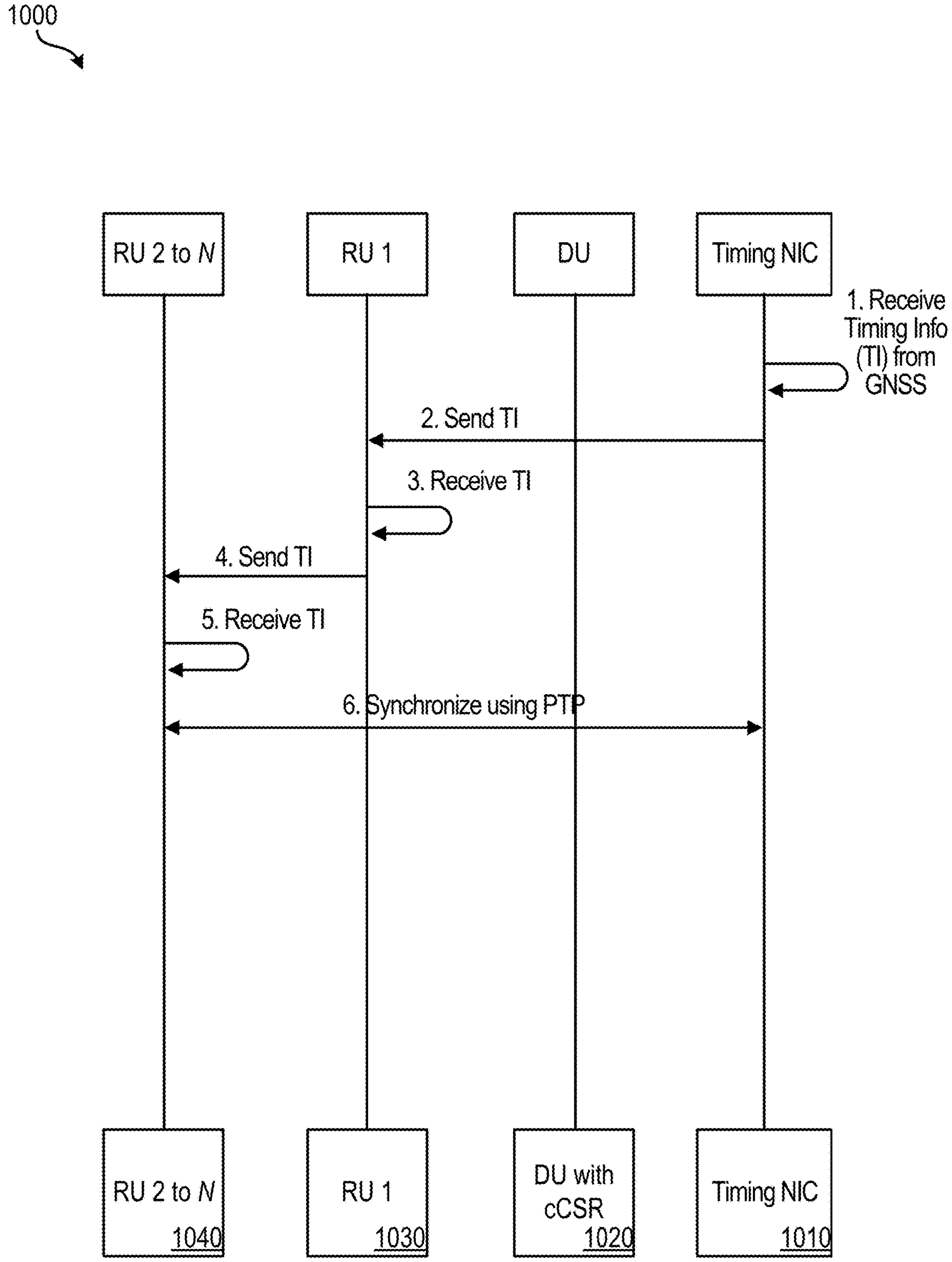
FIG. 10 is sequence diagram illustrating clock synchronization interactions between components of a RAN configuration supported by a containerized CSR in a dual synchronization configuration, according to embodiments of the present invention.

FIG. 10 is sequence diagram illustrating a timing synchronization sequence 1000 in a RAN supported by a containerized CSR with a dual synchronization configuration. Timing synchronization sequence 1000 may include operations performed by one or more components of a RAN, such as RAN 400 and/or RAN 500 described above. For example, the RAN may include timing NIC 1010, DU 1020, first RU 1030, and second RUs 1040. First RU 1030 and second RUs 1040 may each be managed by DU 1020. While illustrated as separate components, DU 1020 may include timing NIC 1010, as described above in reference to RAN 400. As illustrated, timing synchronization sequence 1000 may begin with timing NIC 1010 receiving timing information from a GNSS receiver. Timing NIC 1010 may then synchronize its internal clock to the reference time signal provided by the GNSS receiver. Once synchronized, timing synchronization sequence 1000 may proceed with timing NIC 1010 transmitting timing synchronization information directly to first RU 1030. In this way, DU 1020 and first RU 1030 may be synchronized with each other in a similar manner as the LLS-C1 synchronization configuration.

Timing synchronization sequence 1000 may proceed with first RU 1030 transmitting timing synchronization information directly to one or more RUs of second RUs 1040. Once received, the one or more RUs of second RUs 1040 may synchronize their internal clocks to that of first RU 1030 and DU 1020. Additionally, or alternatively, each of the one or more RUs of second RUs 1040 may receive unique timing synchronization information in a cascading manner from a preceding RU of the second RUs, as described in relation to FIG. 5. In either case, second RUs 1040 may be synchronized to first RU 1030 and DU 1020 in a similar manner as the LLS-C2 synchronization configuration.

Figure 11:
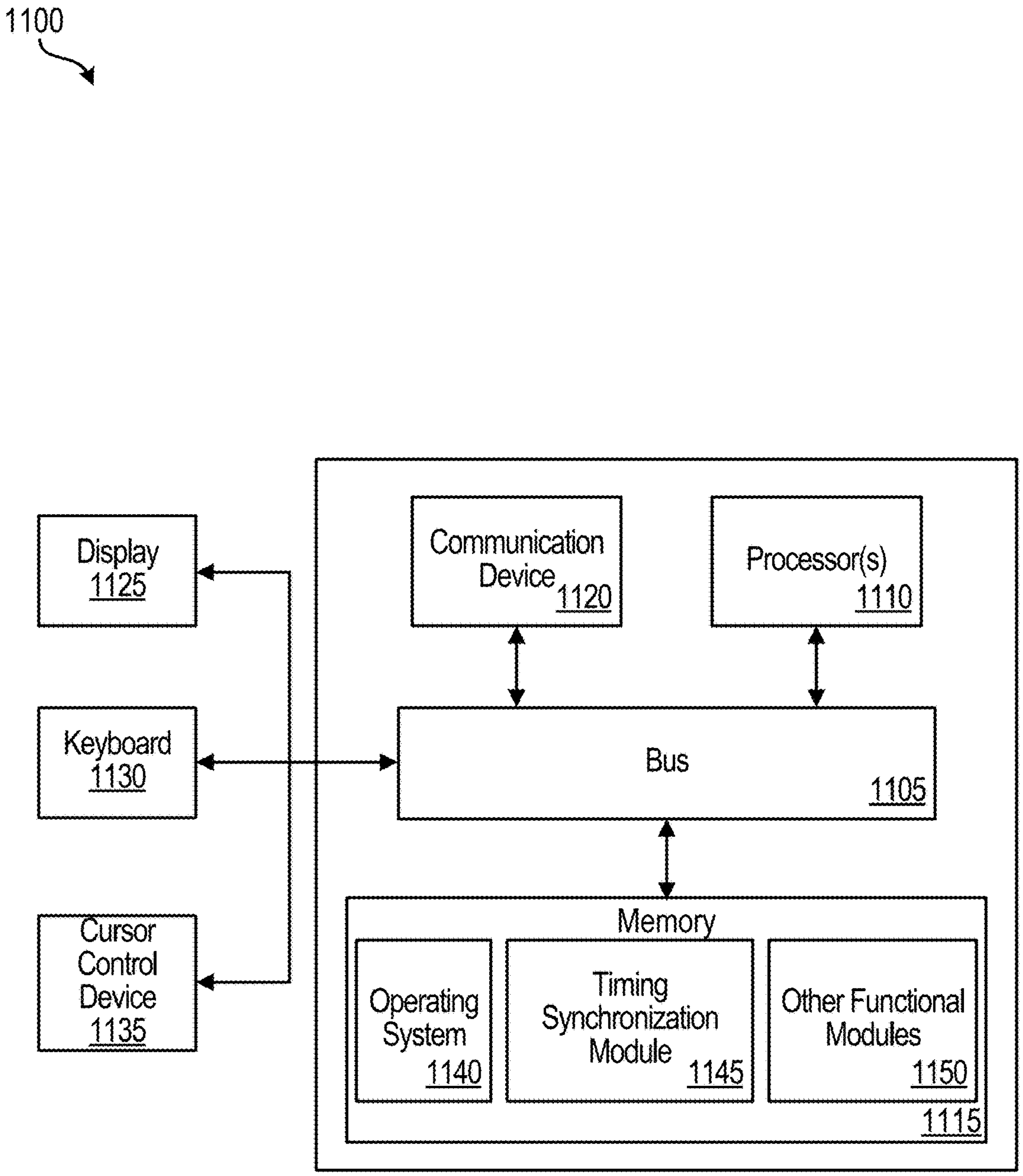
FIG. 11 is an architectural diagram illustrating a computing system configured to perform part of synchronization operations described herein, according to embodiments of the present invention.

FIG. 11 is an architectural diagram illustrating a computing system 1100 configured to perform part of synchronization operations described herein. In some embodiments, computing system 1100 may be one or more of the computing systems depicted and/or described herein, such as an RU, a DU, a CU, a CSR, another carrier network server or computing system, etc. Computing system 1100 includes bus 1105 or other communication mechanism for communicating information, and processor(s) 1110 coupled to bus 1105 for processing information. Processor(s) 1110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1110 may also have multiple processing cores, and at least some of the cores may be configured to perform specific functions. Multi-parallel processing may be used in some embodiments. In certain embodiments, at least one of processor(s) 1110 may be a neuromorphic circuit that includes processing elements that mimic biological neurons. In some embodiments, neuromorphic circuits may not require the typical components of a Von Neumann computing architecture.

Computing system 1100 further includes memory 1115 for storing information and instructions to be executed by processor(s) 1110. Memory 1115 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1110 and may include volatile media, non-volatile media, or both. The media may also be removable, non-removable, or both.

Additionally, computing system 1100 includes a communication device 1120, such as a transceiver, to provide access to a communications network via a wireless and/or wired connection. In some embodiments, communication device 1120 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1120 may include one or more antennas that are singular, arrayed, phased, switched, beamforming, beamsteering, a combination thereof, and or any other antenna configuration without deviating from the scope of the invention.

Processor(s) 1110 are further coupled via bus 1105 to display 1125, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1125 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

Keyboard 1130 and cursor control device 1135, such as a computer mouse, a touchpad, etc., are further coupled to bus 1105 to enable a user to interface with computing system 1100. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100. The modules further include timing synchronization module 1145 that is configured to perform all or part of the processes described herein or derivatives thereof. Computing system 1100 may include one or more additional functional modules 1150 that include additional functionality.

One skilled in the art will appreciate that a "computing system" could be embodied as a server, an embedded computing system, an RU, a DU, a CSR, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 12:
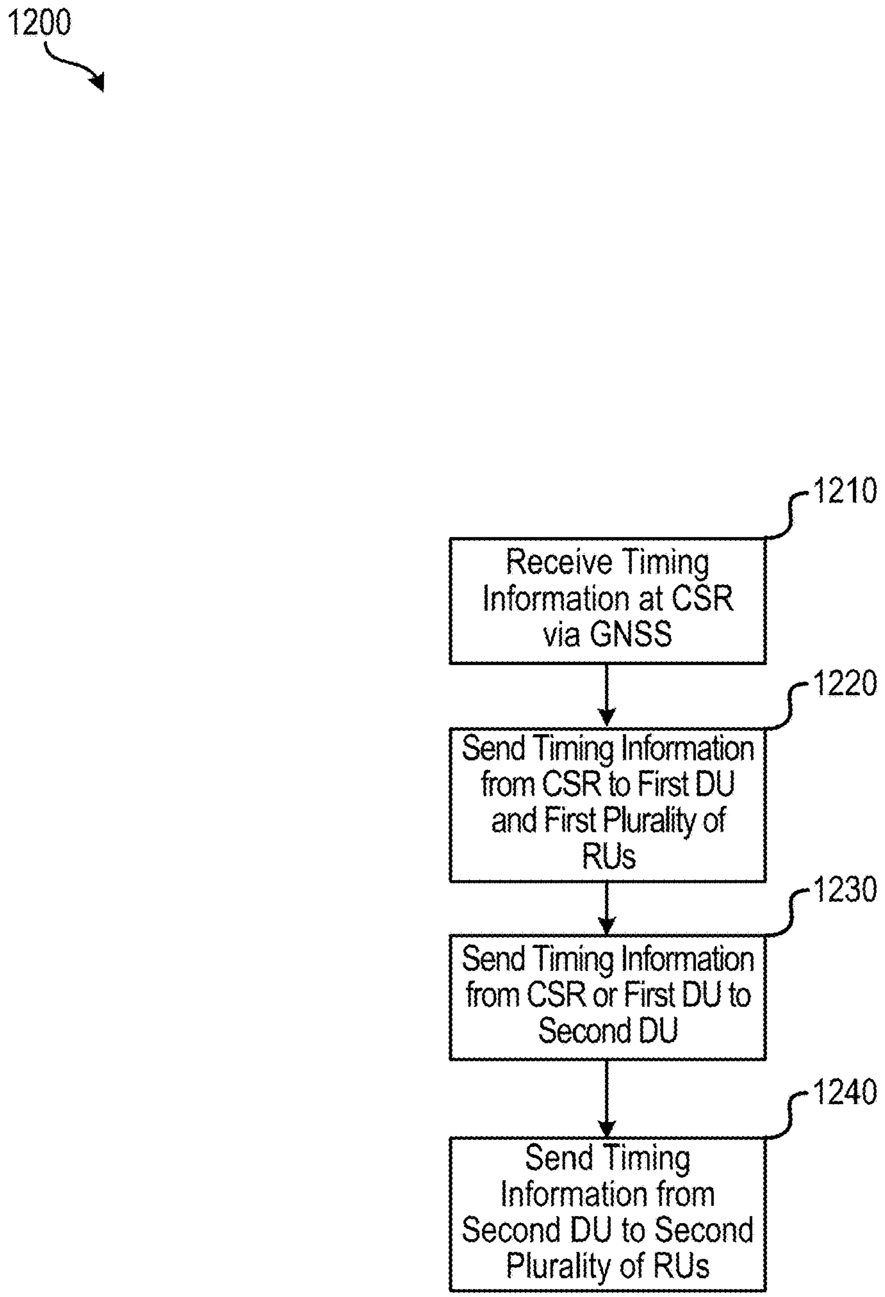
FIG. 12 is a flowchart illustrating a method for providing timing synchronization in a RAN with dual synchronization configurations for multiple DUs, according to embodiments of the present invention.

FIG. 12 is a flowchart illustrating a method 1200 for providing timing synchronization in a RAN with dual synchronization configurations for multiple DUs. For example, the steps of method 1200 may be performed by one or more components of RAN 300 as described above. Method 1200 may begin at block 1210 with a CSR receiving reference timing information from a GNSS receiver. Once received, the CSR may use the reference timing information from the GNSS receiver to set or synchronize its internal clock to the reference timing information. At block 1220, timing information is sent from the CSR to a first DU and a first plurality of RUs. Once received, the first DU and first plurality of RUs may use the timing information from the CSR to synchronize their internal clocks to that of the CSR in a similar manner as the LLS-C3 synchronization configuration.

At block 1230, timing information is sent from the CSR or the first DU to a second DU. The second DU may use the timing information from the CSR or the first DU to synchronize its internal clock to that of the CSR and/or the first DU. At block 1240, timing information is sent from the second DU directly to a second plurality of RUs. Once the timing information from the second DU is received, the second plurality of RUs may use the timing information to synchronize their internal clocks to that of the second DU in a similar manner as the LLS-C1 synchronization configuration.

Figure 13:
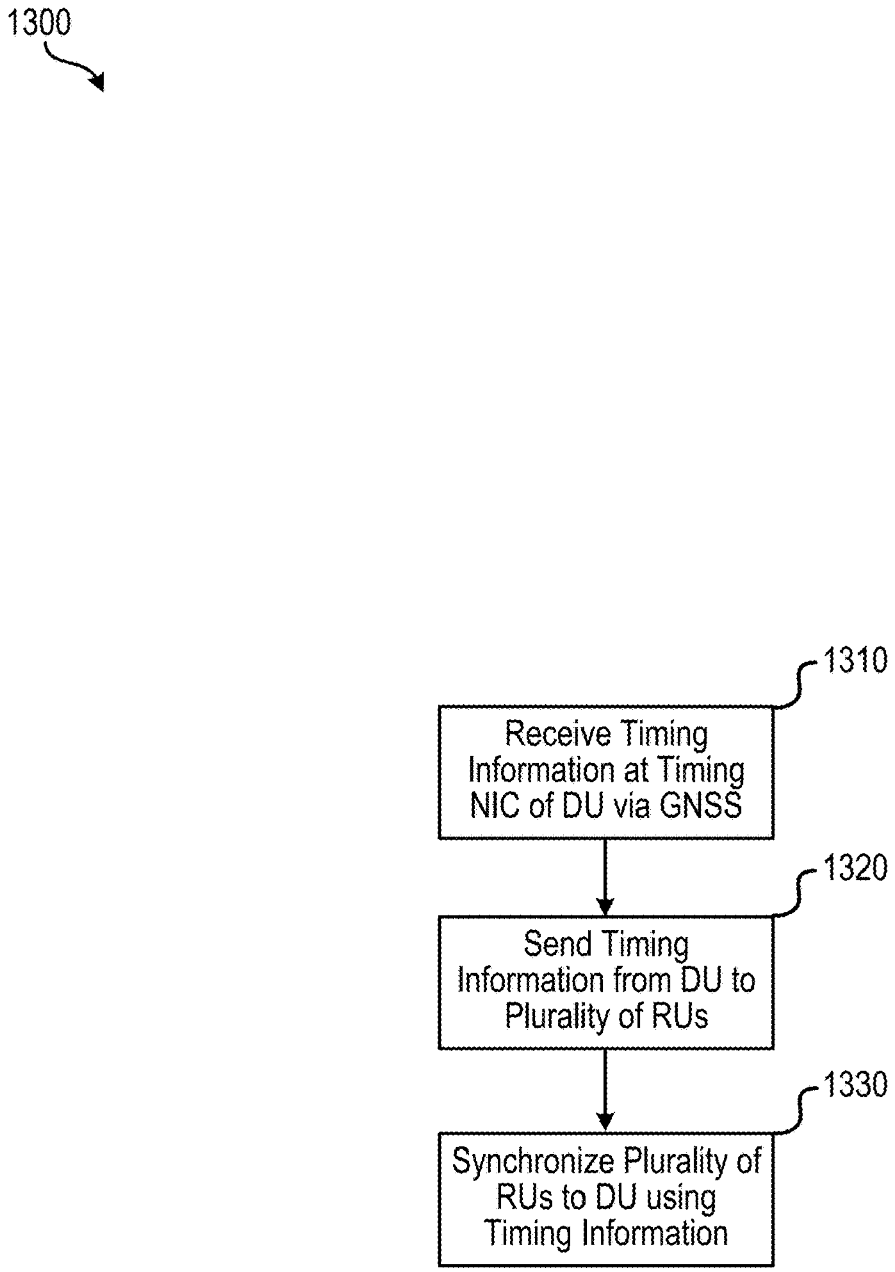
FIG. 13 is a flowchart illustrating a method for providing timing synchronization in a RAN configuration supported by a containerized CSR, according to embodiments of the present invention.

FIG. 13 is a flowchart illustrating a method 1300 for providing timing synchronization in a RAN supported by a containerized CSR. For example, the steps of method 1300 may be performed by one or more components of RAN 400 and/or RAN 500 as described above. Method 1300 may begin at block 1310 with receiving reference timing information at a timing NIC of a DU via a GNSS receiver. Once received, the timing NIC may use the reference timing information from the GNSS receiver to set or synchronize its internal clock to the reference timing information. At block 1320, timing information is sent from the DU directly to a plurality of RUs. The timing information may be sent by the timing NIC of the DU. At block 1330, the timing information from the DU is used to synchronize the plurality of RUs to the DU.

While not illustrated, method 1300 may further include the transmission of timing information from the DU to one or more additional DUs. Each additional DU may use the timing information from the first DU to synchronize their internal clock to that of the first DU (e.g., the clock of the timing NIC). Subsequently, timing information may be sent from each additional DU to a respective plurality of RUs. Each respective plurality of RUs may then synchronize their internal clocks to that of the DU from which the timing information was received, and by proxy, the first DU acting as the PRTC.

Figure 14:
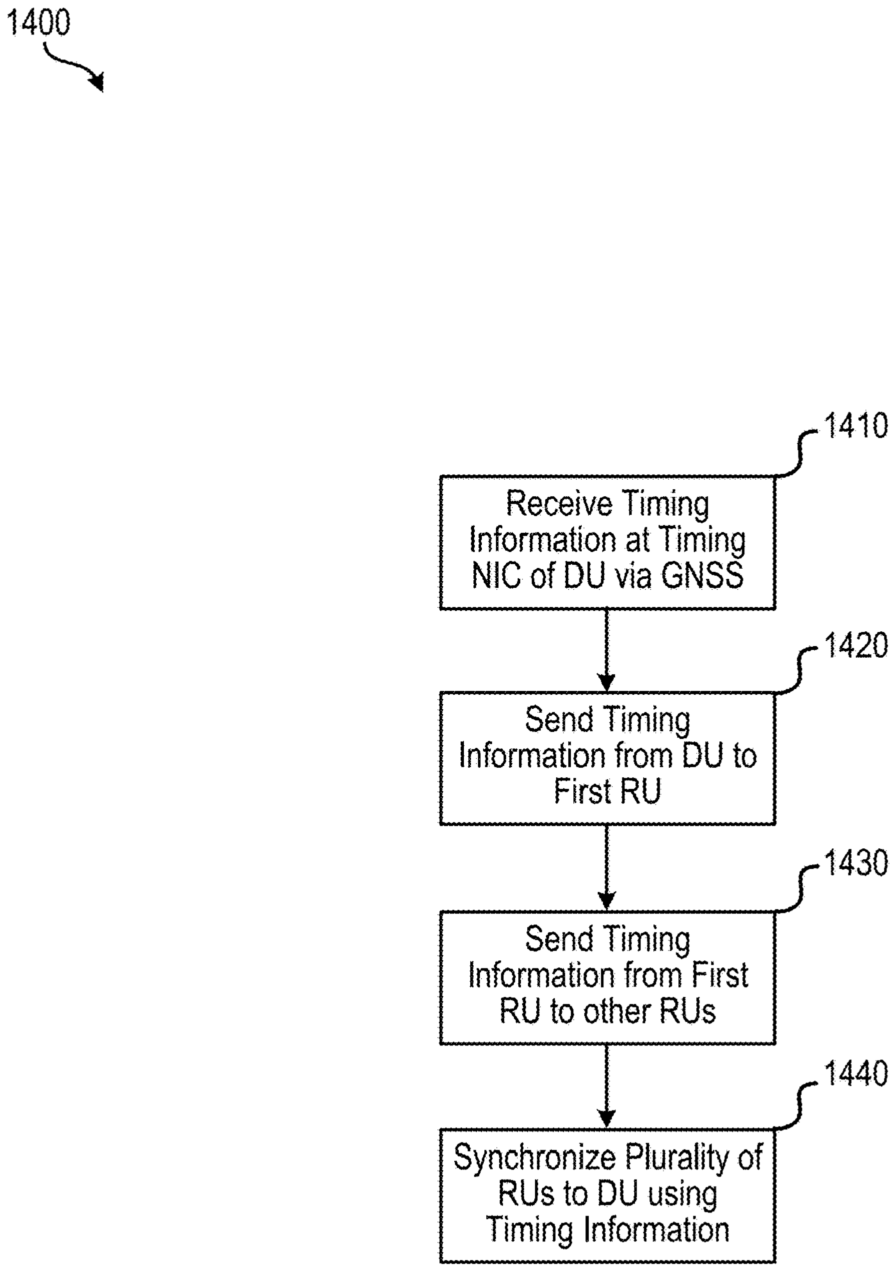
FIG. 14 is a flowchart illustrating a method for providing timing synchronization in a RAN with dual synchronization configurations, according to embodiments of the present invention.

FIG. 14 is a flowchart illustrating a method 1400 for providing timing synchronization in a RAN supported by a containerized CSR with dual synchronization configurations. For example, the steps of method 1400 may be performed by one or more components of RAN 400 and/or RAN 500 as described above. Method 1400 may begin at block 1410 with receiving reference timing information at a timing NIC of a DU via a GNSS receiver. Once received, the timing NIC may use the reference timing information from the GNSS receiver to set or synchronize its internal clock to the reference timing information. At block 1420, timing information is sent from the DU directly to a first RU. The timing information may be sent by the timing NIC of the DU to the first RU.

At block 1430, timing information is sent from the first RU to other RUs. The other RUs may be managed by the same DU. The first RU may transmit the timing information to the other RUs directly or in a daisy chain, as described above in reference to RAN 500. At block 1440, the timing information is used to synchronize the plurality of RUs to the DU. For example, the first RU may use the timing information from the DU to synchronize its internal clock to the internal clock of the DU. The other RUs may further use the timing information from the first RU to synchronize their internal clocks to the first RU, or the preceding RU from which the timing information was received, and by proxy, the DU.

The process steps performed in FIGS. 7-10 and 12-14 may be performed by computer program(s), encoding instructions for the processor(s) to perform at least part of the process(es) described in 7-10 and 12-14, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 1110 of computing system 1100 of FIG. 11) to implement all or part of the process steps described in FIGS. 7-10 and 12-14, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A Radio Access Network (RAN), comprising:

a first Radio Unit (RU);

a Global Navigation Satellite System (GNSS) receiver that receives time signals from one or more GNSS transmitters and generates first timing information from the time signals;

a first Distributed Unit (DU) connected to the first RU, wherein the first DU manages the first RU, and the first DU comprises:

a containerized Cell Site Router (cCSR) that routes user data, control data, or both between the first DU, the first RU, and one or more additional RUs of the RAN; and a timing Network Interface Card (NIC) connected to the GNSS receiver; and a second DU connected to the timing NIC of the first DU; wherein:

the timing NIC uses the first timing information from the GNSS receiver to set an internal clock of the timing NIC;

the timing NIC uses its internal clock to generate and transmit second timing information to the first RU;

the first RU uses the second timing information to synchronize an internal clock of the first RU to the internal clock of the timing NIC;

the timing NIC uses its internal clock to generate and transmit third timing information to the second DU; and the second DU uses the third timing information to synchronize an internal clock of the second DU to the internal clock of the timing NIC.

2. The RAN of claim 1, further comprising a direct connection between the timing NIC and the first RU, wherein the second timing information is transmitted to the first RU via the direct connection.

3. The RAN of claim 1, wherein the direct connection is an ethernet cable.

4. The RAN of claim 1, wherein the timing NIC and the first RU use the Precision Time Protocol (PTP) to synchronize the internal clock of the first RU to the internal clock of the timing NIC.

5. The RAN of claim 1, wherein the DU uses Frequency Division Duplexing (FDD), Time Division Duplexing (TDD), or both.

6. The RAN of claim 1, wherein the first RU is part of a femtocell, a picocell, or a microcell.

7. The RAN of claim 1, further comprising:

a second RU connected to and managed by the second DU, wherein:

the second DU transmits fourth timing information to the second RU; and the second RU uses the fourth timing information to synchronize an internal clock of the second RU to the internal clock of the second DU, the internal clock of the timing NIC, or both.

8. The RAN of claim 1, further comprising:

a second RU managed by the first DU, wherein:

the timing NIC uses the internal clock to generate and transmit fourth timing information to the second RU; and the second RU uses the fourth timing information to synchronize an internal clock of the second RU to the internal clock of the timing NIC.

9. The RAN of claim 1, further comprising:

a second RU controlled by the first DU, wherein:

the first RU transmits fourth timing information to the second RU; and the second RU uses the fourth timing information to synchronize an internal clock of the second RU to the internal clock of the first RU, the internal clock of the timing NIC, or both.

10. The RAN of claim 9, wherein the first RU generates the fourth timing information from a signal of the internal clock of the first RU after synchronizing the internal clock of the first RU to the internal clock of the timing NIC.

11. The RAN of claim 9, wherein the first RU transmits the fourth timing information to the second RU via a direct connection between the first RU and the second RU.

12. The RAN of claim 1, wherein the first DU uses Frequency Division Duplexing (FDD) and the second DU uses Time Division Duplexing (TDD), or vice versa.

13. The RAN of claim 1, wherein both the first DU and the second DU use Frequency Division Duplexing (FDD), or both the first DU and the second DU use Time Division Duplexing (TDD).

14. The RAN of claim 1, wherein the first RU and the first DU are part of a 5G cellular network.

15. A method of synchronizing components in a Radio Access Network (RAN), comprising:

receiving, by a timing Network Interface Card (NIC) of a first Distributed Unit (DU), first timing information from a Global Navigation Satellite System (GNSS) receiver;

setting, by the timing NIC, an internal clock of the timing NIC using the first timing information;

generating and transmitting, by the timing NIC, second timing information to a first Radio Unit (RU), wherein the first RU is managed by the first DU;

synchronizing, by the first RU, an internal clock of the first RU to the internal clock of the timing NIC using the second timing information;

generating and transmitting, by the timing NIC, third timing information to a second DU, wherein the second DU is connected to the timing NIC of the first DU; and synchronizing, by the second DU, an internal clock of the second DU to the internal clock of the timing NIC using the third timing information.

16. The method of synchronizing components in a RAN of claim 15, wherein the second timing information is transmitted to the first RU via a direct connection between the timing NIC and the first RU.

17. The method of synchronizing components in a RAN of claim 15, further comprising:

generating and transmitting, by the first RU, fourth timing information to a second RU, wherein the second RU is connected to the first RU and managed by the first DU; and synchronizing, by the second RU, an internal clock of the second RU to the internal clock of first RU, the internal clock of the timing NIC, or both, using the fourth timing information.

18. A Radio Access Network (RAN), comprising:

a first Radio Unit (RU);

a second RU connected to the first RU;

a Global Navigation Satellite System (GNSS) receiver that receives time signals from one or more GNSS transmitters and generates first timing information from the time signals;

a first Distributed Unit (DU) connected to the first RU, wherein the first DU manages the first RU, and the first DU comprises:

a containerized Cell Site Router (cCSR) that routes user data, control data, or both between the first DU, the first RU, and one or more additional RUs of the RAN; and a timing Network Interface Card (NIC) connected to the GNSS receiver;

wherein:

the timing NIC uses the first timing information from the GNSS receiver to set an internal clock of the timing NIC;

the timing NIC uses its internal clock to generate and transmit second timing information to the first RU;

the first RU uses the second timing information to synchronize an internal clock of the first RU to the internal clock of the timing NIC;

the first RU uses its internal clock to generate and transmit third timing information to the second RU;

the second RU uses the third timing information to synchronize an internal clock of the second RU to the internal clock of the first RU, the internal clock of the timing NIC, or both.

19. The RAN of claim 18, further comprising:

a second DU connected to the timing NIC of the first DU, wherein:

the timing NIC uses its internal clock to generate and transmit fourth timing information to the second DU; and the second DU uses the fourth timing information to synchronize an internal clock of the second DU to the internal clock of the timing NIC.

20. The RAN of claim 19, further comprising:

a third RU connected to and managed by the second DU, wherein:

the second DU transmits fifth timing information to the second RU; and the third RU uses the fifth timing information to synchronize an internal clock of the third RU to the internal clock of the second DU, the internal clock of the timing NIC, or both.

* * * * *